United States Patent
Letson et al.

(10) Patent No.: US 12,090,911 B2
(45) Date of Patent: *Sep. 17, 2024

(54) SYSTEMS AND METHODS FOR RECEIVING RETAIL PRODUCTS

(71) Applicant: Walmart Apollo, LLC, Bentonville, AR (US)

(72) Inventors: Eric A. Letson, Bentonville, AR (US); Bruce W. Wilkinson, Rogers, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 72 days.

This patent is subject to a terminal disclaimer.

(21) Appl. No.: 17/590,729

(22) Filed: Feb. 1, 2022

(65) Prior Publication Data
US 2022/0153182 A1 May 19, 2022

Related U.S. Application Data

(63) Continuation of application No. 16/573,019, filed on Sep. 17, 2019, now Pat. No. 11,235,694, which is a (Continued)

(51) Int. Cl.
*B60P 3/20* (2006.01)
*F25D 11/00* (2006.01)
(Continued)

(52) U.S. Cl.
CPC .............. *B60P 3/20* (2013.01); *F25D 11/003* (2013.01); *F25D 29/003* (2013.01);
(Continued)

(58) Field of Classification Search
CPC ........ B60P 3/20; F25D 11/003; F25D 29/003; F25D 2700/08; F25D 2700/16; G06Q 10/0832

See application file for complete search history.

(56) References Cited

U.S. PATENT DOCUMENTS

| 6,882,269 B2 | 4/2005 | Moreno |
| 6,933,832 B1 | 8/2005 | Simms |

(Continued)

FOREIGN PATENT DOCUMENTS

| CA | 2391000 | 5/2001 |
| EP | 2835078 A1 | 2/2015 |

(Continued)

OTHER PUBLICATIONS

Bonaccorsi, Manuele et al.; "'HighChest': An Augmented Freezer Designed for Smart Food Management and Promotion of Eco-Efficient Behaviour"; https://www.ncbi.nlm.nih.gov/pmc/articles/PMC5492167/; Jun. 11, 2017; pp. 1-30.

(Continued)

*Primary Examiner* — Marc E Norman
(74) *Attorney, Agent, or Firm* — Fitch, Even, Tabin & Flannery LLP

(57) ABSTRACT

In some embodiments, apparatuses and methods are provided herein useful to receiving retail products. In some embodiments, there is provided a system for receiving retail products including a storage container. The storage container includes one or more chambers; one or more sensors including at least a radio frequency sensor; a locking assembly; and a storage container control circuit configured to provide an unlock signal based on a first trigger signal associated with at least one of the one or more sensors and a second trigger signal associated with an electronic control device to enable access to the one or more chambers.

18 Claims, 14 Drawing Sheets

Related U.S. Application Data continuation of application No. 16/192,655, filed on Nov. 15, 2018, now Pat. No. 10,449,889.

(60) Provisional application No. 62/593,046, filed on Nov. 30, 2017.

(51) Int. Cl.
*F25D 29/00* (2006.01)
*G06Q 10/0832* (2023.01)

(52) U.S. Cl.
CPC ..... *G06Q 10/0832* (2013.01); *F25D 2700/08* (2013.01); *F25D 2700/16* (2013.01)

(56) References Cited

U.S. PATENT DOCUMENTS

| | | | |
|---|---|---|---|
| 10,121,301 B1* | 11/2018 | Ren | G07C 9/00896 |
| 10,449,889 B2 | 10/2019 | Letson | |
| 11,235,694 B2 | 2/2022 | Letson | |
| 2003/0056946 A1* | 3/2003 | Breeden | F24F 11/62 165/238 |
| 2003/0091708 A1 | 5/2003 | Garwood | |
| 2003/0126866 A1 | 7/2003 | Spry | |
| 2004/0160304 A1 | 8/2004 | Mosgrove | |
| 2004/0164847 A1 | 8/2004 | Hale | |
| 2005/0061877 A1 | 3/2005 | Stevens | |
| 2006/0020366 A1 | 1/2006 | Bloom | |
| 2006/0122852 A1 | 6/2006 | Moudy | |
| 2006/0157142 A1 | 7/2006 | Hillam | |
| 2008/0047282 A1 | 2/2008 | Bodin | |
| 2009/0143923 A1 | 6/2009 | Breed | |
| 2009/0145912 A1 | 6/2009 | Hyde | |
| 2010/0004772 A1 | 1/2010 | Elfstrom | |
| 2010/0030431 A1 | 2/2010 | Potter | |
| 2010/0253519 A1 | 10/2010 | Brackmann | |
| 2013/0257048 A1 | 10/2013 | Neddermeyer, III | |
| 2013/0319032 A1 | 12/2013 | Ball | |
| 2014/0002236 A1* | 1/2014 | Pineau | G07C 9/00309 340/5.6 |
| 2015/0006005 A1 | 1/2015 | Yu | |
| 2015/0179036 A1 | 6/2015 | Heine | |
| 2016/0012337 A1 | 1/2016 | Kaye | |
| 2016/0058181 A1 | 3/2016 | Han | |
| 2016/0098870 A1 | 4/2016 | Bergerhoff | |
| 2016/0140496 A1 | 5/2016 | Simms | |
| 2016/0300187 A1 | 10/2016 | Kashi | |
| 2016/0371642 A1 | 12/2016 | Wilkinson | |
| 2017/0124792 A1* | 5/2017 | Schoenfelder | G07C 9/00722 |
| 2017/0265687 A1 | 9/2017 | Veltrop | |
| 2017/0267347 A1 | 9/2017 | Rinaldi | |
| 2018/0031296 A1 | 2/2018 | Winkle | |
| 2018/0068253 A1 | 3/2018 | Simms | |
| 2018/0077592 A1 | 3/2018 | Kim | |
| 2018/0101818 A1 | 4/2018 | Simms | |
| 2018/0130017 A1 | 5/2018 | Gupte | |
| 2018/0144299 A1 | 5/2018 | Simms | |
| 2018/0181126 A1* | 6/2018 | Seaman | B60R 25/01 |
| 2018/0283048 A1 | 10/2018 | Hage | |
| 2018/0300675 A1 | 10/2018 | Arena | |
| 2018/0315013 A1 | 11/2018 | Wilkinson | |
| 2018/0365639 A1 | 12/2018 | Simms | |
| 2018/0365640 A1 | 12/2018 | Simms | |
| 2019/0043298 A1 | 2/2019 | Moudy | |
| 2019/0057350 A1 | 2/2019 | Simms | |
| 2019/0102730 A1 | 4/2019 | Giorgi | |
| 2019/0251505 A1 | 8/2019 | Simms | |
| 2019/0266819 A1 | 8/2019 | Mchale | |
| 2019/0277552 A1 | 9/2019 | Vu | |
| 2020/0051009 A1 | 2/2020 | Simms | |

FOREIGN PATENT DOCUMENTS

| | | |
|---|---|---|
| WO | 2001078022 | 10/2001 |
| WO | 2003036573 | 5/2003 |
| WO | 2018204251 | 11/2018 |
| WO | 2019108473 | 6/2019 |

OTHER PUBLICATIONS

Korosec, Kirsten; "Volvo's Solution for the Package Theft Epidemic: Your Car's Trunk"; http://fortune.com/2016/05/10/volvo-urb-it-delivery/; May 10, 2016; pp. 1-2.
LOCKTIN; "About LocknCool"; http://www.locktin.com/about-lockncool/; Available at least as early as Nov. 17, 2017; pp. 1-3.
Monnit; "Monnit Wireless Sensor Systems for Commercial Refrigeration Monitoring!"; https://www.monnit.com/solutions/commercial-refrigeration; Available at least as early as Nov. 13, 2017; pp. 1-4.
PCT; App. No. PCT/US2018/030181; International Search Report and Written Opinion mailed Aug. 8, 2018.
PCT; App. No. PCT/US2018/062432; International Search Report and Written Opinion mailed Feb. 7, 2019.
SHOPBOX; "Grocery Deliveries Reimagined"; http://www.shopbox.co.uk/; Available at least as early as Nov. 17, 2017; pp. 1-8.
U.S. Appl. No. 15/928,415; Office Action mailed Jul. 17, 2020; (pp. 1-29).
U.S. Appl. No. 16/192,655; Notice of Allowance mailed Jun. 17, 2019; (pp. 1-12).
U.S. Appl. No. 16/573,019; Notice of Allowance mailed Sep. 20, 2021; (pp. 1-10).
U.S. Appl. No. 16/573,019; Office Action mailed May 27, 2021; (pp. 1-13).

* cited by examiner

| Date | Comment | Time | Outside Temp (°F) | Chamber 1 Temp (°F) | Chiller Temp (°F) | Delta | Compressor Temp (°F) |
|---|---|---|---|---|---|---|---|
| Day 1 | Simulated increasing outside temperature with fan turned on to move cold air from chiller to chamber 1 | 6:35 | 75 | 8 | 5 | 3 | |
| | | 8:00 | 97 | 9 | 6 | 3 | 105 |
| | | 9:00 | 103 | 14 | 9 | 5 | 114 |
| | | 10:00 | 107 | 17 | 12 | 5 | 116 |
| | | 12:30 | 112 | 23 | 20 | 3 | 136 |
| | | 13:30 | 108 | 24 | 20 | 4 | 119 |
| | | 14:27 | 108 | 23 | 20 | 3 | 117 |
| | | 16:24 | 107 | 23 | 20 | 3 | 117 |
| Day 2 | | 6:30 | 110 | 26 | 23 | 3 | 117 |
| | | 8:31 | 110 | 26 | 23 | 3 | 122 |
| | | 9:53 | 110 | 27 | 23 | 4 | 117 |
| | | 13:08 | 111 | 27 | 24 | 3 | 117 |
| | | 14:01 | 111 | 27 | 24 | 3 | 118 |
| | | 15:17 | 111 | 27 | 24 | 3 | 117 |
| | Fan turned off | 15:57 | 111 | 27 | 24 | 3 | 117 |
| | | 16:12 | 111 | 43 | 10 | | 117 |
| | | 16:27 | 111 | 36 | 0 | | 117 |
| | | 16:42 | 111 | 39 | -3 | | 117 |
| | | 16:57 | 111 | 52 | -5 | | 117 |
| Day 3 | | 7:25 | 114 | 80 | -3 | | 117 |
| | | 8:33 | 112 | 81 | -3 | | 117 |
| | Simulated hot temperature | 8:41 | 112 | 80 | -3 | | |
| | | 10:24 | 112 | 80 | -2 | | |
| | | 15:10 | 115 | 84 | 0 | | |
| | | 16:09 | 116 | 84 | 0 | | |
| | | 17:00 | 117 | 85 | 0 | | |
| Day 4 | Turned fan on to transfer cold air from chiller to chamber 1 | 7:07 | 98 | 73 | -7 | | |
| | | 8:06 | 98 | 40 | 36 | 4 | |
| | | 10:08 | 98 | 28 | 26 | 2 | |
| | | 11:11 | 99 | 26 | 23 | 3 | |
| | | 12:13 | 98 | 24 | 21 | 3 | |

FIG. 12

SYSTEMS AND METHODS FOR RECEIVING RETAIL PRODUCTS

CROSS-REFERENCE TO RELATED APPLICATION(S)

This application is a continuation of U.S. application Ser. No. 16/573,019 filed Sep. 17, 2019, which is a continuation of U.S. application Ser. No. 16/192,655 filed Nov. 15, 2018, now U.S. Pat. No. 10,449,889, which claims the benefit of U.S. Provisional Application No. 62/593,046 filed Nov. 30, 2017, all of which are incorporated herein by reference in their entirety.

TECHNICAL FIELD

This invention relates generally to receiving retail products at a customer site.

BACKGROUND

Generally, when a customer submits a retail order for a retail product, the customer indicates on the retail order where and/or to whom to deliver the retail product. Depending on instructions indicated on the retail order, a delivery agent may deliver the retail product at a customer site designated by the customer.

BRIEF DESCRIPTION OF THE DRAWINGS

Disclosed herein are embodiments of systems, apparatuses and methods pertaining to receiving retail products at a customer site. This description includes drawings, wherein:

FIG. 12 shows an illustrative non-limiting test data of an exemplary system for receiving retail products to be delivered at a customer site in accordance with some embodiments;

Figure 1:
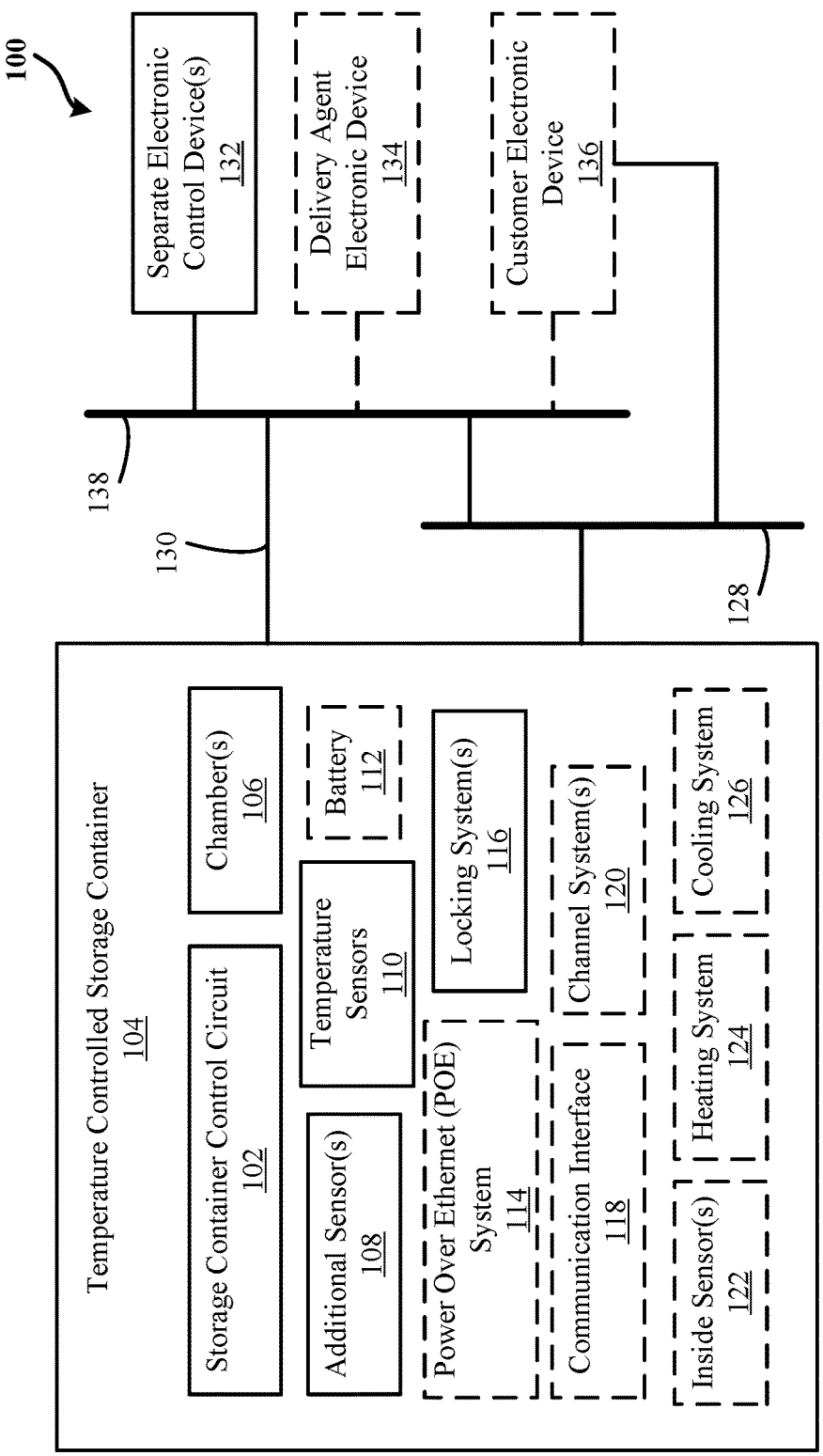
FIG. 1 illustrates a simplified block diagram of an exemplary system for receiving retail products to be delivered at a customer site in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

Detailed Description

Generally speaking, pursuant to various embodiments, systems, apparatuses and methods are provided herein useful for receiving retail products to be delivered at a customer site. In some embodiments, a system for receiving retail products to be delivered at a customer site includes a temperature controlled storage container at the customer site. The temperature controlled storage container at the customer site may include one or more chambers having corresponding chamber temperatures that are each individually maintained and adjustable based on a particular temperature assigned by a separate electronic control device to each of the one or more chambers. By one approach, the temperature controlled storage container may include one or more temperature sensors coupled to the one or more chambers and may provide the corresponding chamber temperatures. In one example, each of the corresponding chamber temperatures may be a temperature read by at least one of the one or more temperature sensors associated with each of the one or more chambers. By another approach, the temperature controlled storage container may include one or more additional sensors that provide data corresponding to living beings approaching the temperature controlled storage container. By another approach, the temperature controlled storage container may include a locking system. In one configuration, the locking system may receive a lock signal to disable access to at least one of the one or more chambers. In another configuration, the locking system may receive an unlock signal to enable access to the at least one of the one or more chambers. By yet another approach, the temperature controlled storage container may include a storage container control circuit operatively coupled to the one or more temperature sensors and the locking system. In one example, the storage container control circuit may receive the particular temperature assigned by the separate electronic control device to each of the one or more chambers. In another example, the storage container control circuit may maintain each one of the corresponding chamber temperatures based on the particular temperature assigned to each of the one or more chambers and the temperature read by the at least one of the one or more temperature sensors. By one approach, the storage container control circuit may determine whether a first trigger signal is received from one of the one or more additional sensors. By another approach, the storage container control circuit may determine whether a second trigger signal is available from the separate electronic control device. By another approach, the storage container control circuit may provide the unlock signal to the locking system based on the determination that the first trigger signal is received and that the second trigger signal is available to enable access to the at least one of the one or more chambers.

In some embodiments, the system may include a separate electronic control device remote from and communicatively coupled to the temperature controlled storage container. By one approach, the separate electronic control device may provide the particular temperature assigned to each of the one or more chambers based on an external temperature outside of the temperature controlled storage container, one or more retail products to be delivered and stored in the one or more chambers, and an estimated delivery time of the one or more retail products. By another approach, the separate electronic control device may selectively assign each of the one or more retail products to one of the one or more chambers based on at least one of: a product temperature associated with each retail product of the one or more retail products and the particular temperature assigned to each of the one or more chambers. By another approach, the separate electronic control device may provide the second trigger signal based on at least one of: the estimated delivery time of the one or more retail products, an authorization to access from a customer associated with the temperature controlled storage container, and an authentication signal received from the customer.

In some embodiments, a system for receiving retail products to be delivered at a customer site using a temperature controlled storage container includes a power over ethernet (POE) system. The POE system may provide power to the temperature controlled storage container. By one approach, the temperature controlled storage container coupled to the POE system may include one or more chambers having corresponding chamber temperatures that are each individually maintained by the temperature controlled storage container and adjustable based on instructions from a separate electronic control device. In one configuration, the temperature controlled storage container may include a cooling system operable on a first operable power based on the power provided by the POE system. In one example, the cooling system may selectively decrease one of the corresponding chamber temperatures of the one or more chambers based on a temperature assigned to corresponding one of the one or more chambers. In another configuration, the temperature controlled storage container may include a heating system operable on a second operable power based on the power provided by the POE system. In one scenario, the heating system may selectively increase the one of the corresponding chamber temperatures of the one or more chambers based on the temperature assigned to corresponding one of the one or more chambers. In another configuration, the temperature controlled storage container may include a storage container control circuit operable on a third operable power based on the power provided by the POE system and operatively coupled to the cooling system and the heating system. By one approach, the storage container control circuit may determine whether the one of the corresponding chamber temperatures is within a threshold of the temperature assigned to the corresponding one of the one or more chambers. By another approach, the storage container control circuit may initiate a first operation of the cooling system when the corresponding one of the one or more chambers is greater than the threshold. By another approach, the storage container control circuit may initiate a second operation of the heating system when the corresponding one of the one or more chambers is less than the threshold.

In some embodiments, the system may include a separate electronic control device remote from and communicatively coupled to the temperature controlled storage container. By one approach, the separate electronic control device may provide the temperature assigned to the corresponding one of the one or more chambers based on an external temperature outside of the temperature controlled storage container, one or more retail products to be delivered and stored in the one or more chambers, and an estimated delivery time of the one or more retail products. In one configuration, the separate electronic control device may adjust each of the corresponding chamber temperatures based on the temperature assigned to the corresponding one of the one or more chambers that is provided to the temperature controlled storage container.

In another embodiments, a method for receiving retail products to be delivered at a customer site includes receiving, from a separate electronic control device, a particular assigned temperature of a plurality of assigned temperatures to a particular chamber of one or more chambers of a temperature controlled storage container. By one approach, each of the one or more chambers may be assigned, by the separate electronic control device, a corresponding one of the plurality of assigned temperatures. By another approach, the method may include maintaining a chamber temperature of the particular chamber based on the particular assigned temperature and a temperature read by at least one of one or more temperature sensors of the temperature controlled storage container associated with the particular chamber. In one configuration, the method may include determining whether a first trigger signal is received from one or more sensors of the temperature controlled storage container. In another configuration, the method may include determining whether a second trigger signal is available from the separate electronic control device. In another configuration, the method may include providing an unlock signal to a locking system of the temperature controlled storage container based on the determining that the first trigger signal is received and that the second trigger signal is available. In one example, the unlock signal may enable access to the particular chamber.

In yet some embodiments, the method may include providing, by a separate electronic control device, the particular assigned temperature to each of the one or more chambers based on an external temperature outside of the temperature controlled storage container, one or more retail products to be delivered and stored in the one or more chambers, and an estimated delivery time of the one or more retail products. In one configuration, the method may include selectively assigning, by the separate electronic control device, each of the one or more retail products to one of the one or more chambers based on at least one of: a product temperature associated with each retail product of the one or more retail products and the particular assigned temperature to each of the one or more chambers. In another configuration, the method may include providing, by the separate electronic control device, the second trigger signal based on at least one of: the estimated delivery time of the one or more retail products, an authorization to access from a customer associated with the temperature controlled storage container, and an authentication signal received from the customer.

In yet some embodiments, a system for receiving retail products may include a temperature controlled storage container. By one approach, the temperature controlled storage container may include one or more chambers having corresponding chamber temperatures that are each individually maintained and adjustable based on a particular temperature assigned by a server to each of the one or more chambers.

In some embodiments, the temperature controlled storage container may include a vehicle. Alternatively or in addition to, the storage container control circuit may determine whether at least one of: a human and an animal is inside the one or more chambers based on the at least one of: motion data, sound data, and infrared data received by the storage container control circuit when the temperature controlled storage container is stationary over a period of time. Alternatively or in addition to, the storage container control circuit may, in response to the determination that the at least one of: the human and the animal is inside the one or more chambers, provide the unlock signal to the locking system without receiving the first trigger signal and the second trigger signal to allow the at least one of: the human and the animal to exit out of the one or more chambers. Alternatively or in addition to, the storage container control circuit may, in response to the determination that the at least one of: the human and the animal is inside the one or more chambers, provide warning signal to at least one of: a delivery agent electronic device, a customer electronic device, an electronic device associated with a user of the temperature controlled storage container, and one or more electronic devices proximate to the temperature controlled storage container.

FIG. 1 illustrates a simplified block diagram of an exemplary system 100 for receiving retail products to be delivered at a customer site in accordance with some embodiments. The system 100 includes a temperature controlled storage container ("storage container") 104. By one approach, the storage container 104 may be communicatively coupled to one or more separate and geographically remote separate electronic control devices 132 via a cellular network 130 and/or a home-enabled internet network 128. By one approach, the cellular network 130 may include a mobile network, and/or a communication network where the last link is wireless. By another approach, the home-enabled internet network 128 may include a home network, a local area network, a WiFi network, a cable network, and/or an internet service provider (ISP) network. By yet another approach, the cellular network 130 and/or the home-enabled internet network 128 may be coupled to an internet network 138. In one example, when the storage container 104 is connected to the separate electronic control device 132, the delivery agent electronic device 134, and/or the customer electronic device 136, the storage container 104 may be connected to the internet network 138 via the cellular network 130. In such example, the storage container 104 may have a capability to directly initiate communication to the separate electronic control device 132, the delivery agent electronic device 134, and/or the customer electronic device 136 through the communication interface 118 coupled to the cellular network 130. By one approach, the storage container 104 may directly initiate communication to one or more cellular towers to connect to the separate electronic control device 132, the delivery agent electronic device 134, and/or the customer electronic device 136 through the internet network 138. In another example, the storage container 104 may initiate communication with the separate electronic control device 132, the delivery agent electronic device 134, and/or the customer electronic device 136 through the internet network 138 via the home-enabled internet network 128. In yet another example, the customer electronic device 136 may directly communicate to the storage container 104 via a local connection established through the home-enabled internet network 128. In some embodiments, the separate electronic control device 132 may include a server, a computer, a portable electronic device (e.g., a smartphone, a laptop, a smartwatch, a table, etc.), a cloud-based computer, a distributed computing system, and/or other types of electronic devices having one or more control circuits.

In one configuration, the storage container may be communicatively coupled to a customer electronic device 136. In one example, the customer electronic device 136 may include a smart phone, a laptop, a cell phone, a computer, and/or any devices that may be used by a customer to connect to the storage container 104 via the cellular network 130 and/or the home-enabled internet network 128. In another configuration, the storage container 104 may temporarily communicatively couple to a delivery agent electronic device 134 via the cellular network 130 and/or other wireless communication method (e.g., Wi-Fi, Bluetooth, etc.). In one example, the delivery agent electronic device 134 may include a smart phone, a laptop, a cell phone, a computer, and/or any devices that may be used by a delivery agent to communicatively connect to the storage container 104. In another configuration, the storage container 104 may include one or more chambers 106 that are configured to store one or more retail products. By one approach, the one or more chambers 106 have corresponding chamber temperatures that are each individually maintained and adjustable based on a particular temperature assigned by the separate electronic control device 132 to each of the one or more chambers 106. In some implementations, the separate electronic control device 132 may include a distributed computing system including one or more control circuits, computers, processors, and/or microprocessors. In some implementations, the separate electronic control device 132 may include an electronic device associated with a user. For example, the electronic device may include the customer electronic device 136. In another example, the electronic device may include a smartphone, a smartwatch, a laptop, an iPad, a tablet, among other types of portable electronic devices.

By one approach, the storage container 104 may include a storage container control circuit 102. In one configuration, the storage container 104 may include one or more temperature sensors 110 coupled to the storage container control circuit 102. In another configuration, the storage container 104 may include one or more additional sensors 108 coupled to the storage container control circuit 102. In one example, the one or more additional sensors 108 may include accelerometer sensor, sound sensor, environmental sensor, weather sensor, moisture sensor, humidity sensor, acceleration sensor, distance sensor, navigation and/or location sensor, optical sensor, light sensor, imaging sensor, proximity sensor, motion sensor, and/or radio frequency sensor, and/or other types of sensors configured to use in operation of the storage container 104 as described herein. In yet another configuration, the storage container 104 may include a locking system(s) 116 coupled to the storage container control circuit 102. In one example, the locking system(s) 116 may include a latching locking system, a magnetic lock system, a solenoid lock system, and/or a motor lock system, among other type locking mechanism used to secure the storage container 104. In another configuration, the storage container 104 includes one or more communication interfaces 118 that enable the storage container to communicatively couple to the cellular network 130 and/or the home-enabled internet network 128. In one example, the communication interface 118 may include a wired and/or wireless receiver, a wired and/or wireless transmitter, an ethernet port, wired and/or wireless transceiver, other such communication interfaces, or combination of two or more of such interfaces. By one approach, the storage container 104 may include a heating system 124 and/or a cooling system 126 coupled to the storage container control circuit 102. In one example, the heating system 124 and/or a cooling system 126 may include one or more fans, heating elements, and/or chillers configured to increase and/or decrease a temperature of a chamber of the one or more chambers 106. By one approach, chamber temperatures of the storage container 104 may be each individually and separately maintainable and/or adjustable by initiating and controlling operations of the heating system 124 and/or a cooling system 126. In another configuration, one or more of the one or more chambers 106 may be coupled to one or more inside sensors 122. In one example, the one or more sensors 122 may include motion sensor, humidity sensor, audio sensors, infrared sensor, and/or a sensor configured to detect that a human, an animal, or a live being is inside the one or more of the one or more chambers 106. In such an example, the inside sensors 122 are distinct from the temperature sensors 110 and/or the additional sensors 108. In another example, the additional sensors 108 may include the inside sensors 122.

In another example, the storage container 104 received electrical power from one or more external power sources (e.g., electrical outlet of a delivery location, a street light, etc.) and/or internal power sources. In some implementations, for example, the storage container may include and/or couple with one or more batteries 112. By one approach, the battery 112 may be coupled to the storage container control circuit 102. By another approach, the battery 112 may be coupled to a power over ethernet (POE) system 114. In yet another configuration, the storage container 104 may include the POE system 114. In one scenario, the POE system 114 may be coupled to the storage container control circuit 102. By one approach, the POE system 114 may include a network switch, a POE power injector, and/or a power source (e.g., Alternating Current (AC) or Direct Current (DC) power sources). In another configuration, the POE system 114 may be coupled to the storage container control circuit 102, the battery 112, the one or more additional sensors 108, the one or more temperature sensors 110, the locking system 116, the communication interface 118, the one or more inside sensors 122, the heating system 124, the cooling system 126, and/or other components and/or devices associated with and/or part of the storage container 104.

In yet another configuration, the storage container 104 may include one or more channel systems 120 on one or more portions of one or more perimeter surfaces and/or exterior of the storage container 104. By one approach, the one or more channel systems 120 may receive one or more interchangeable skin panels secured by grooves of the channel system 120 to add a customizable surface on the one or more portions of the perimeter surface of the storage container 104. For example, a customer may order a particular interchangeable skin panels based on his/her preferences or desires and slide the particular interchangeable skin panels through the one or more channel systems 120. By one approach, the particular interchangeable skin panels are slid through from a top opening of the one or more channel systems 120.

In yet another configuration, the storage container 104 may only be communicatively coupled to a user, a delivery agent and/or a customer associated with the storage container 104 via one or more remote connections to the storage container control circuit 102. For example, to communicate with the storage container 104, the customer may log into a retail store application operable on the customer electronic device 136 using one or more authentication data through the internet network 138. In another example, when the home-enabled internet network 128 is not operable, the storage container 104 may communicate to the separate electronic control device 132 through the cellular network 130. By one approach, a switch from the home-enabled internet network 128 to the cellular network 130 may be automatic when the storage container 104 determines a loss of connection to the home-enabled internet network 128. In one scenario, the loss of connection may be determined by the storage container control circuit 102 based on a lack of communication data received from the separate electronic control device 132 via the communication interface 118, a detected threshold reduction in received and/or transmitted data rates, and/or other such conditions. By another approach, the storage network 104 may communicate to the separate electronic control device 132 through the customer electronic device 136.

In some embodiments, the storage container 104 may be associated with a customer site. By one approach, the chamber temperatures of the one or more chambers 106 may be each individually maintained and adjustable based on a particular temperature assigned by the separate electronic control device 132 to each of the one or more chambers. In one configuration, the particular temperature may be determined by the separate electronic control device 132 based on an external temperature outside of the storage container 104, the one or more retail products to be delivered and stored in the one or more chambers 106, and an estimated delivery time of the one or more retail products. By one approach, the particular temperature may be provided by the separate electronic control device 132 to the storage container 104. In such an approach, each of the one or more chambers 106 may be assigned a particular temperature. In one scenario, the external temperature outside of the storage container 104 may be provided by one or more of the additional sensors 108. In another scenario, the external temperature may be provided by a weather forecast provided to the separate electronic control device 132. By one approach, the weather forecast may be based on a location coordinate associated with the storage container 104. In one example, the location coordinate may be provided to the separate electronic control device 132 by one of the additional sensors 108 and/or the storage container control circuit 102. By another approach, the one or more retail products to be delivered and stored in the one or more chambers 106 may be associated with one or more customer orders associated with a customer associated with the storage container 104 and/or the customer site. By another approach, the estimated delivery time of the one or more retail products may be based on a projected delivery time based on the one or more customer orders, transit time from a distribution center to the storage container 104, delivery of other customers' retail products, and/or other factors that may affect the estimated delivery time of the one or more retail products.

In another configuration, the separate electronic control device 132 may selectively assign each of the one or more retail products to one of the one or more chambers 106 based on a product temperature associated with each retail product of the one or more retail products and/or the particular temperature assigned to each of the one or more chambers 106. In one example, a determination of a particular product temperature associated with each of the retail products is described in the U.S. Provisional Application No. 62/434,293, filed May 1, 2017, which is incorporated herein by reference in its entirety. In such an example, the determination of the particular product temperature may correspond to a determination of the particular temperature range described in the U.S. Provisional Application No. 62/434,293. In another example, the determination of the particular product temperature may be based on a temperature and/or a temperature range that may keep a corresponding one of the retail products fresh, in substantially good quality, and/or within a proper storage temperature range particular to each one of the one or more retail products. By one approach, the storage container control circuit 102 may periodically request one or more updates of the assigned temperature of each of the one or more chambers. In such an approach, the separate electronic control device 132 may provide an updated assigned temperature to each of the one or more chambers 106 based on an updated external temperature reading outside of the storage container 104, the one or more retail products to be delivered, an updated estimated delivery time of the one or more retail products, and/or operational power requirement of the storage container 104 relative to availability of POE power provided by the POE system 114.

In one configuration, one or more of the one or more temperature sensors 110 coupled to corresponding one of the one or more chambers 106 may provide corresponding one of the corresponding chamber temperatures. By one approach, each of the corresponding chamber temperatures may be a temperature read by at least one of the one or more temperature sensors 110 associated with each of the one or more chambers 106. In one example, the temperature read for each of the chambers 106 may be provided to the storage container control circuit 102. In another example, the temperature of each chamber may be read and/or provided to the storage container control circuit 102 periodically and/or based on a trigger provided by the separate electronic control device 132. In another example, the trigger provided by the separate electronic control device 132 may be based on the estimated delivery time of the one or more retail products.

In another configuration, the one or more additional sensors 108 may provide data corresponding to living beings approaching the storage container 104 to the storage container control circuit 102. In one example, the provided data may initiate a first trigger signal to the storage container control circuit 102. By one approach, the first trigger signal may include motion data provided by a motion sensor, radio frequency signal emitted by a user device, infrared data provided by infrared sensor, radio frequency identifier (RFID) signal, imaging data provided by an imaging sensor, other such data or combination of two or more of such data. In one example, the storage container 104 may include the imaging sensor. In another example, the imaging sensor may be remote from and communicatively coupled to the storage container control circuit 102.

In another configuration, the locking system 116 may receive a lock signal to disable access to one or more of the one or more chambers 106. Alternatively or in addition to, the locking system 116 may receive an unlock signal to enable access to the one or more of the one or more chambers 106. In one example, the storage container control circuit 102 may provide the unlock signal to the locking system 116. By one approach, the storage container control circuit 102 may be operatively coupled to the one or more temperature sensors 110 and/or the locking system 116. By another approach, the storage container control circuit 102 may receive the particular temperature assigned by the separate electronic control device 132 to each of the one or more chambers 106. Alternatively or in addition, the storage container control circuit 102 may associate each particular temperature to a corresponding one of the one or more chambers 106. By one approach, the association may be stored in a database associated with the storage container 104. By another approach, the storage container 104 may include the database.

By another approach, the storage container control circuit 102 may maintain each one of the corresponding chamber temperatures based on the particular temperature assigned to each of the one or more chambers 106 and the temperature read by one or more of the one or more temperature sensors 110. In one configuration, the storage container control circuit 102 may determine whether a first trigger signal may be received from one of the one or more additional sensors 108. In one example, the storage container control circuit 102 may determine whether a second trigger signal is available from the separate electronic control device 132. By one approach, the second trigger may be based on proximity in time of the first trigger signal to the estimated delivery time of the one or more retail products, authorization to access received from a customer associated with the storage container 104, and/or an authentication signal received from the customer and/or a delivery agent. In one example, the authentication signal may be based on RFID on the one or more retail products to be delivered, proximity sensor on front of the storage container 104, near-field communication (NFC) handshake with the delivery agent electronic device 134 and/or the customer electronic device 136 (e.g., a mobile device), one or more PIN numbers entered on touch pad of the delivery agent electronic device 134 and/or the customer electronic device 136, and/or a mobile application handshake. In an illustrative non-limiting example, a delivery agent may approach the storage container 104. By one approach, the one or more additional sensors 108 may initiate providing data corresponding the delivery agent when the delivery agent is within a sensing distance of the one or more additional sensors 108. In such an approach, the data provided by the one or more additional sensors 108 may be the first trigger signal to the storage container 104 to determine whether the second trigger signal is available. In one configuration, the second trigger signal may be initiated when the one or more retail products is within a threshold distance from the storage container 104. In another configuration, the delivery agent electronic device(s) 134 associated with the delivery agent(s) responsible for delivering the one or more retail products may provide a location data corresponding to the current location of the delivery agent electronic device(s) 134 and/or the one or more retail products. In such a configuration, the current location may be provided to the separate electronic control device 132.

For example, the separate electronic control device 132 may receive the current location periodically. In one configuration, the separate electronic control device 132 may determine whether the one or more retail products is proximate the storage container 104 based on the received current location and a location coordinate associated with the storage container 104. By one approach, when the received current location is within a threshold distance from the storage container 104, the separate electronic control device 132 may provide and/or make available the second trigger signal. By another approach, the customer associated with the storage container 104 and/or the one or more retail products may provide the authorization to access one or more of the chambers 106 to the separate electronic control device 132. In such an approach, the authorization to access may correspond to the second trigger signal provided to the storage container 104. By another approach, the authentication signal may be provided by the customer and/or the delivery agent. In one example, the authentication signal may be one or more authentication factor authentication (e.g., two-factor authentication). For example, the authentication signal may be initiated from a passcode entry, a biometric authentication, among other types of authentications.

In some embodiments, the storage container control circuit 102 may provide the unlock signal to the locking system 116 based on the determination that the first trigger signal is received and that the second trigger signal is available from the separate electronic control device 132 to enable access to the one or more of the one or more chambers 106. By one approach, the separate electronic control device 132 may be remote from and communicatively coupled to the storage container 104. In one configuration, the separate electronic control device 132 may provide the second trigger signal based on the estimated delivery time of the one or more retail products, the authorization to access from a customer associated with the storage container 104, and/or the authentication signal received from the customer.

In one configuration, the cooling system 126 may be cooperatively coupled to the storage container control circuit 102. By one approach, the cooling system 126 may selectively decrease one or more of the corresponding chamber temperatures based on a corresponding one of the particular temperature assigned to each of the one or more chambers 106. By another approach, the heating system 124 may be cooperatively coupled with the cooling system 126 and the storage container control circuit 102. By another approach, the heating system 124 may selectively increase the one or more of the corresponding chamber temperatures based on a corresponding one of the particular temperature assigned to each of the one or more chambers 106. In one example, the storage container control circuit 102 may maintain each one of the corresponding chamber temperatures by cooperatively initiating operations of the cooling system 126 and the heating system 124. For example, in determining that the temperature read in one chamber of the chambers 106 by one or more of the temperature sensors 110 is less than the particular temperature, the storage container control circuit 102 may increase the chamber temperature by initiating operation of the heating system 124. In another example, when the temperature read in one chamber of the chambers 106 by one or more of the temperature sensors 110 is greater than the particular temperature, the storage container control circuit 102 may decrease the chamber temperature by initiating the cooling system 126. By one approach, the storage container control circuit 102 may automatically adjust the chamber temperature by periodically increasing and/or decreasing the chamber temperature.

By one approach, the storage container control circuit 102 may be communicatively coupled to a cellular network when the storage container 104 determines a loss of connection to the home-enabled internet network 128. In one example, the loss of connection may be triggered by an absence of communication data through the communication interface 118 over a period of time. By another approach, the storage container control circuit 102 may provide a message indicating status of the one or more retail products, the one or more additional sensors 108, the one or more temperature sensors 110, location data of the storage container 104 when the storage container control circuit 102 detects unauthorized relocation of the storage container 104, and/or failure of components affecting quality and/or freshness of the one or more retail products to a customer associated with the storage container 104 via the cellular network 130 instead of the home-enabled internet network 128. In one example, the message may be provided to the separate electronic control device 132, the delivery agent electronic device 134, and/or the customer electronic device 136.

By another approach, the one or more inside sensors 122 may be coupled to the storage container control circuit 102. In one configuration, one or more of the inside sensors 122 may provide motion data, sound data, and/or infrared data inside the one or more chambers 106. For example, a child may have hidden inside one of the chambers 106 and accidentally gotten locked in. Consequently, the child may move and/or scream. In one configuration, the movement of the child may correspond to the motion data provided by a motion sensor to the storage container control circuit 102. In another configuration, the scream of the child may correspond to the sound data provided by a sound sensor to the storage container control circuit 102. In yet another configuration, heat coming out the child may correspond to the infrared data provided by an infrared sensor to the storage container control circuit 102. By one approach, in response to receiving data from the one or more of the inside sensors 122, the storage container control circuit 102 may determine whether the human and/or the animal is inside the one or more chambers 106 based on the motion data, the sound data, and/or the infrared data received by the storage container control circuit 102 over a period of time. For example, the period of time may correspond to a time that enables the storage container control circuit 102 to substantially differentiate between a momentary drop and/or movement of a retail products inside one of the chambers 106 from a movement of a human and/or an animal. In another example, the period of time may correspond to greater than 3 seconds, 10 seconds, 15 seconds, and/or a particular time that allows determination that a movement corresponds to a human and/or an animal and not of a retail products inside the chamber. In such an approach, in response to the determination, the storage container control circuit 102 may provide an unlock signal to the locking system 116 without having to receive the first trigger signal and the second trigger signal to allow the human (e.g., the child) and/or the animal to exit out of the one or more chambers 106. As such, the storage container 104 may be child-proof and/or animal-proof, thus, preventing a live being from being accidentally locked inside the chambers 106. In some configuration, in response to the determination, the storage container control circuit 102 may provide warning signal to the delivery agent electronic device 134, the customer electronic device 136, an electronic device associated with a user of the temperature controlled storage container 104, and/or one or more electronic devices proximate to the temperature controlled storage container 104. In some embodiments, the temperature controlled storage container 104 may include a vehicle, a stationary and/or portable temperature controlled holder, repository, vessel, canister, can, box, and/or receptacle. In some implementations, the storage container control circuit 102 and the separate electronic control device 132 or an electronic device configured to perform functions corresponding to the separate electronic control device 132 as described herein may be integrated with an on-board vehicle control circuit associated with the vehicle. In some implementations where the storage container control circuit 102 may include the vehicle, one or more areas/space inside the vehicle may correspond to the one or more chambers. For example, the entire space/area inside the vehicle may correspond to a chamber. In another example, the front driver and passenger sides may correspond to a first chamber while the rear driver and passenger sides may correspond to a second chamber. In yet another example, each of the front and rear passenger and driver sides may correspond to a particular chamber.

Figure 14:
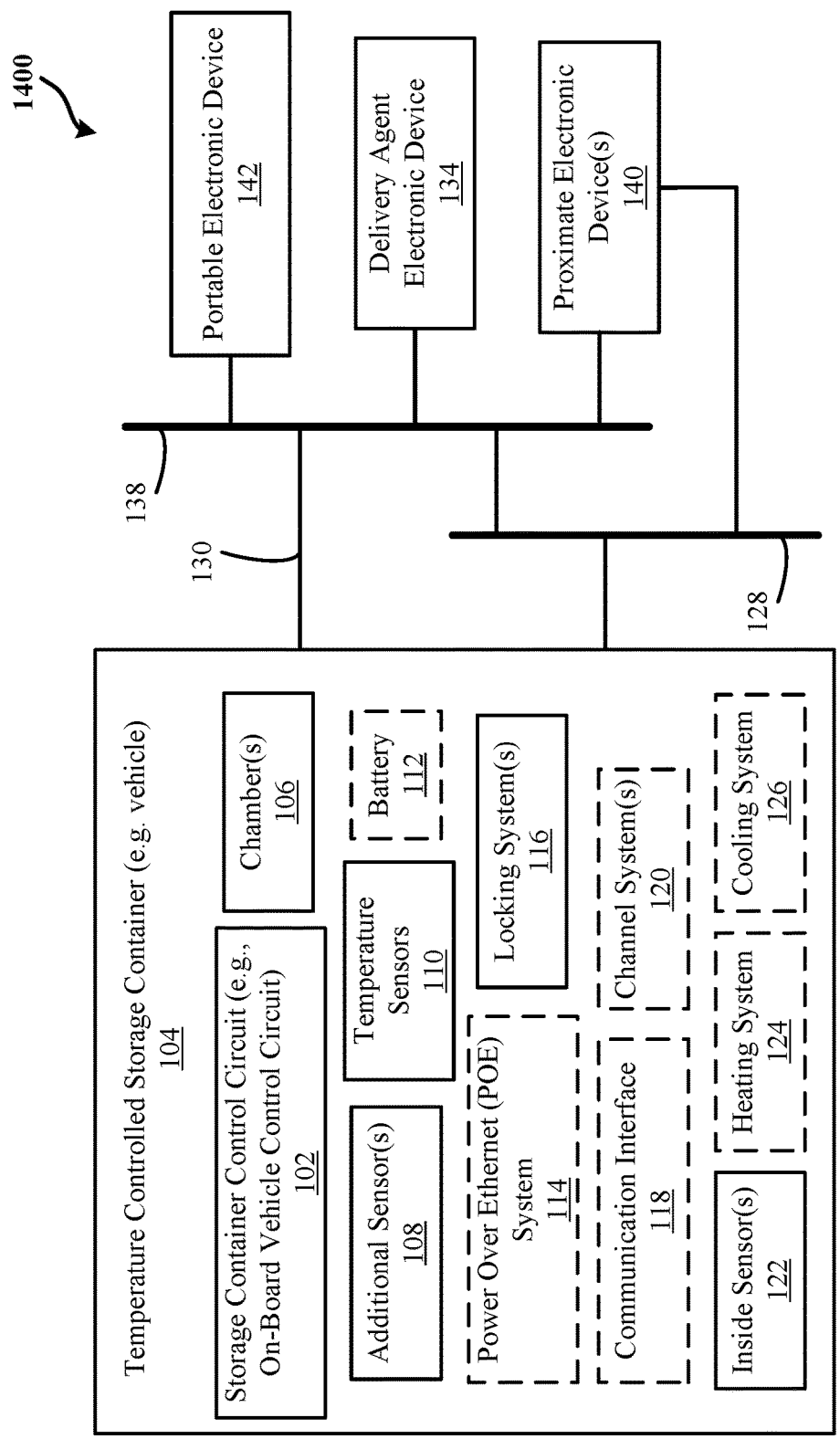
FIG. 14 illustrates a simplified block diagram of an exemplary system for receiving retail products in accordance with some embodiments.

To illustrate, FIG. 14 shows a simplified block diagram of an exemplary system 1400 for receiving retail products in accordance with some embodiments. In this illustrative non-limiting example, the temperature controlled storage container 104 corresponds to a vehicle, the storage container control circuit 102 corresponds to an on-board vehicle control circuit, and the one or more chambers 106 correspond to one or more areas/spaces inside the vehicle. By one approach, functions of the separate electronic control device 132 as described herein may be performed by a portable electronic device 142, such as the customer electronic device 136 of FIG. 1. As such, a user and/or a customer may use an application operable (e.g., an App) on the customer electronic device 136 to perform functions of the separate electronic control device 132 as described herein. In one scenario, the vehicle's temperature and/or particular areas/spaces/chambers (e.g., trunk) of the vehicle may be controlled by the on-board vehicle control circuit based on the retail products stored and/or kept inside the car (for example, the customer/user may have just picked up a fresh produce). By one approach, the temperature may be set based on a preconfigured temperature value substantially enough to transport the retail products to the customer's house. For example, the user may configure the application on the customer electronic device 136 to use the preconfigured temperature value (e.g., user, industry, and/or retail store suggested temperature values). Alternatively or in addition to, the storage container control circuit 102 (e.g., the on-board vehicle control circuit) may provide and/or send one or more warning messages to the customer electronic device 136 and/or one or more proximate electronic devices 140 proximate the temperature controlled storage container 104 (e.g., the vehicle) when the inside sensor(s) 122 senses and/or detects that a human (e.g., a child), an animal (e.g., a dog), and/or any unwanted contents, for example, as configured by the customer via the customer electronic device 136 that may have been left inside the vehicle for a period of time (e.g., a threshold minutes) when the vehicle is stationary and/or parked. By one approach, the storage container control circuit 102 may unlock and/or initiate the locking system(s) 116 to unlock the vehicle and/or send warning messages to the one or more proximate electronic devices 140 proximate the vehicle and/or the customer electronic device 136 alerting the corresponding users (e.g., passersby, police) of the electronic devices 140, 136, 134 that a child and/or an animal may have been left inside the vehicle. In one configuration, the warning messages may be sent until the inside sensor(s) 122 no longer senses and/or detects that a child and/or an animal is inside the vehicle/the temperature controlled storage container 104.

In some embodiments, the system 100 may include a power over ethernet (POE) system 114 that provides power to the storage container 104. In one example, the separate electronic control device 132 may provide instructions to the storage container 104 to maintain and adjust chamber temperatures of each of the chambers 106 using the heating system 124 and the cooling system 126. For example, the instructions may include a particular temperature assignment to each one of the chambers 106. In one configuration, the cooling system 126 and/or the heating system 124 may be operable on a first operable power and a second operable power, respectively. The first operable power and/or the second operable power may be based on the power provided by the POE system 114. For example, the POE power from the POE system 114 may be down converted to one or more operational powers prior to coupling to the storage container control circuit 102, the cooling system 126, and/or the heating system 124. Alternatively or in addition to, in providing the unlock signal to the locking system 116, the storage container control circuit 102 may stop providing the one or more operational powers to the cooling system 126 and/or the heating system 124. Alternatively or in addition to, the storage container control circuit 102 may allow a particular operational power that is based on the POE power to couple with the locking system 116 in response to the storage container control circuit 102 stopping the providing of the one or more operational powers to the cooling system 126 and/or the heating system 124. By one approach, the locking system 116 may enable access to the one or more chambers 106 in response to the coupling with the particular operational power. Alternatively or in addition to, the battery 112 may initiate coupling of backup power to the storage container 104 when the POE power is not provided to the storage container 104. By one approach, the battery 112 may stop coupling of the backup power to the storage container 104 when the POE system 114 starts providing the POE power to the storage container 104. Alternatively or in addition to, in response, the battery 112 may start recharging in preparation of another POE power loss to the storage container 104.

In another configuration, the storage container control circuit 102 may be operable on a third operable power based on the power provided by the POE system 114. In another configuration, the storage container control circuit 102 may be operatively coupled to the cooling system 126 and/or the heating system 124. By one approach, the storage container control circuit 102 may determine whether one of the corresponding chamber temperatures is within a threshold of the temperature assigned to the corresponding one of the one or more chambers 106. By another approach, the storage container control circuit 102 may initiate a first operation of the cooling system 126 when the corresponding one of the one or more chambers is greater than the threshold. Alternatively or in addition to, the storage temperature control circuit 102 may initiate a second operation of the heating system 124 when the corresponding one of the one or more chambers is less than the threshold. For example, the storage container control circuit 102 may periodically receive and/or query for the temperature of one or more of the chambers 106. When the storage container control circuit 102 determines that a temperature on a first chamber of the chambers 106 is below a first threshold of a first assigned temperature while a second chamber of the chambers 106 is above a second threshold of a second assigned temperature, the storage container control circuit 102 may initiate operation of the heating system 124 to bring the chamber temperature of the first chamber within the first threshold of the first assigned temperature. Alternatively and/or in addition to, the storage container control circuit 102 may initiate operation of the cooling system 126 to bring the chamber temperature of the second chamber within the second threshold of the second assigned temperature. By another approach, the storage container control circuit 102 may periodically determine the chamber temperatures of one or more of the chambers 106 and/or a sensor of the additional sensors 108 may trigger the storage container control circuit 102 when the one or more of the chambers 106 is outside a corresponding threshold and/or threshold range of corresponding assigned temperature. By another approach, the separate electronic control device 132 may adjust each of the corresponding chamber temperatures based on the temperature assigned to the corresponding one of the one or more chambers that is provided to the storage container 104. In such an approach, the separate electronic control device 132 may affect the operation of the chamber temperatures by assigning particular temperatures to each chambers while the storage container 104 may affect the operation of the chamber temperatures by maintaining and adjusting the chamber temperatures in accordance with the assigned chamber temperatures of the separate electronic control device 132.

In yet another configuration, a temperature controlled medicine container may be delivered and/or coupled to the storage container 104. By one approach, when the temperature controlled medicine container is placed in one of the chambers 106, an inside locking mechanism of the storage container 104 may automatically couple the temperature controlled medicine container with the storage container 104 to secure the temperature controlled medicine container to the storage container 104. In one configuration, the temperature controlled medicine container may remain secured to the storage container 104 until the locking system 116 receives an unlock signal from the storage container control circuit 102. For example, the storage container control circuit 102 may provide the unlock signal to the locking system 116 and/or the inside locking mechanism. In another example, the temperature controlled medicine container may automatically detach from the inside locking mechanism in response to the unlock signal being received by the locking system 116. In yet another example, when one or more of the additional sensor(s) 108 provide sensor data to the storage container control circuit 102 indicating that the temperature controlled medicine container is empty, the storage container control circuit 102 may provide an unsecure signal to the inside locking mechanism to release the temperature controlled medicine container in preparation of a retrieval by a delivery agent. In some embodiments, the inside locking mechanism may provide power to the temperature controlled medicine container to keep an inside temperature of the temperature controlled medicine container within a threshold of a predefined temperature associated with the temperature controlled medicine container. Alternatively or in addition to, one or more operational powers based on the POE power provided by the POE system 114 may be wirelessly provided to the temperature controlled medicine container to keep the inside temperature within the threshold of the predefined temperature. By one approach, the temperature controlled medicine container may communicate the inside temperature to the separate electronic control device 132 over a time period while stored in one of the chamber 106 via the communication interface 118.

Figure 2:
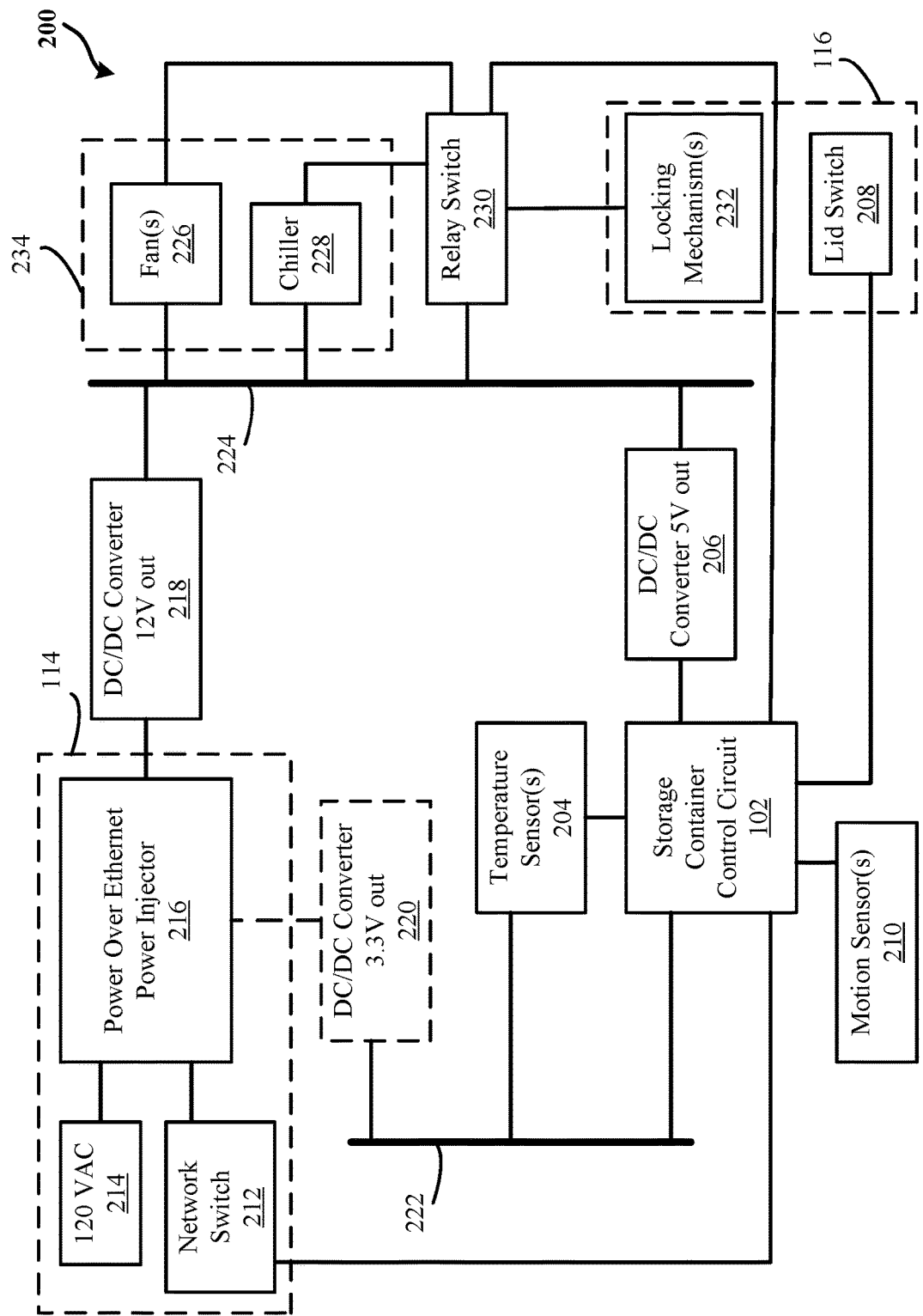
FIG. 2 illustrates a simplified block diagram of an exemplary system for receiving retail products to be delivered at a customer site in accordance with some embodiments.

FIG. 2 illustrates a simplified block diagram of an exemplary system 200 for receiving retail products to be delivered at a customer site in accordance with some embodiments. By one approach, the system 200 may be one of a plurality of illustrative non-limiting examples of the system 100 of FIG. 1. The system 200 includes the POE system 114. By one approach, the POE system 114 may include a power over ethernet (POE) power injector 216. In one configuration, the POE power injector 216 may be coupled with the 120 VAC 214 and a network switch 212. By one approach, the POE power injector 216 may provide POE capability to the storage container 104 of FIG. 1. In such an approach, operational powers used by the storage container 104 may be based on the POE power provided by the POE power injector 216. In another configuration, output of the POE power injector 216 may be coupled to a 12V out DC/DC converter 218. The 12V out DC/DC converter 218 may down convert the POE power to a 12 VDC provided to a 12 VDC power bus 224. Alternatively or in addition to, the 12 VDC may be provided to one or more components of the storage container 104. By one approach, the one or more components of the storage container 104 may include a heating and cooling system 234. In one configuration, the heating and cooling system 234 may correspond to the heating system 124 and the cooling system 126. In another configuration, the heating and cooling system 234 may include a fan(s) 226 and/or a chiller(s) 228. In yet another configuration, the heating and cooling system 234 is coupled to a relay switch(es) 230. By one approach, one or more of the fan(s) 226, the chiller(s) 228, the relay switch(es) 230 may be coupled to the 12 VDC power bus 224. For example, the fan(s) 226 and/or the chiller(s) 228 may correspond to the heating system 124 and/or the cooling system 126 of FIG. 1. Alternatively or in addition to, the fan(s) 226 and/or the chiller(s) 228 may be coupled to and/or operationally controlled by the relay switch(s) 230. In another configuration, the locking system 116 may be coupled to and/or operationally controlled by the relay switch(s) 230. By one approach, the locking system 116 may include a locking mechanism(s) 232. In one configuration, the locking mechanism(s) 232 may include a latching locking system, a magnetic lock system, a solenoid lock system, and/or a motor lock system, among other type locking mechanisms used to secure the storage container 104. For example, the storage container control circuit 102 may remove power to the fan(s) 226 and the chiller(s) 228 for a short period of time to allow the locking mechanism(s) 232 to enable access to the storage container 104 and/or one or more of the chambers 106 by unlocking the locking system 116. In an illustrative non-limiting example, the locking system 116 may draw 31.8 watts power to enable access to the storage container 104 and/or one or more of the chambers 106. In another example, the storage container 104 may operate the locking system 116 with 38.4 watts power. In yet another illustrative non-limiting example, the storage container 104 may operate the locking system 116 with a particular wattage based on power associated with a type of locking mechanism included in the locking system 116, the POE system 114, and/or the storage container control circuit 102.

By one approach, a 5 VDC out DC/DC converter 206 is coupled to the 12 VDC power bus 224. In one configuration, the 5 VDC out DC/DC converter 206 provides a 5 VDC power to the storage container control circuit 102. By one approach, the storage container control circuit 102 may be coupled to the temperature sensor(s) 204, the lid switch 208, and/or a motion sensor(s) 210. In one example, the temperature sensor(s) 204 may correspond to the temperature sensor(s) 110. In another example, the motion sensor(s) 210 may correspond to the additional sensor(s) 108 or the inside sensor(s) 122. In yet another example, the locking system 116 may include the lid switch 208.

By another approach, the POE power injector 216 may be coupled to a 3.3 VDC out DC/DC converter 220. In one configuration, the 3.3 VDC out DC/DC converter 220 may be coupled to a 3.3 VDC power bus 222. In another configuration, a 3.3 VDC is coupled to and/or provided to the temperature sensor(s) 204 and/or the storage container control circuit 102 via the 3.3 VDC power bus 222. In yet another configuration, the storage container control circuit 102 may be coupled to an internet connection through the network switch 212. In one example, the communication interface 118 may correspond to the network switch 212.

Figure 3:
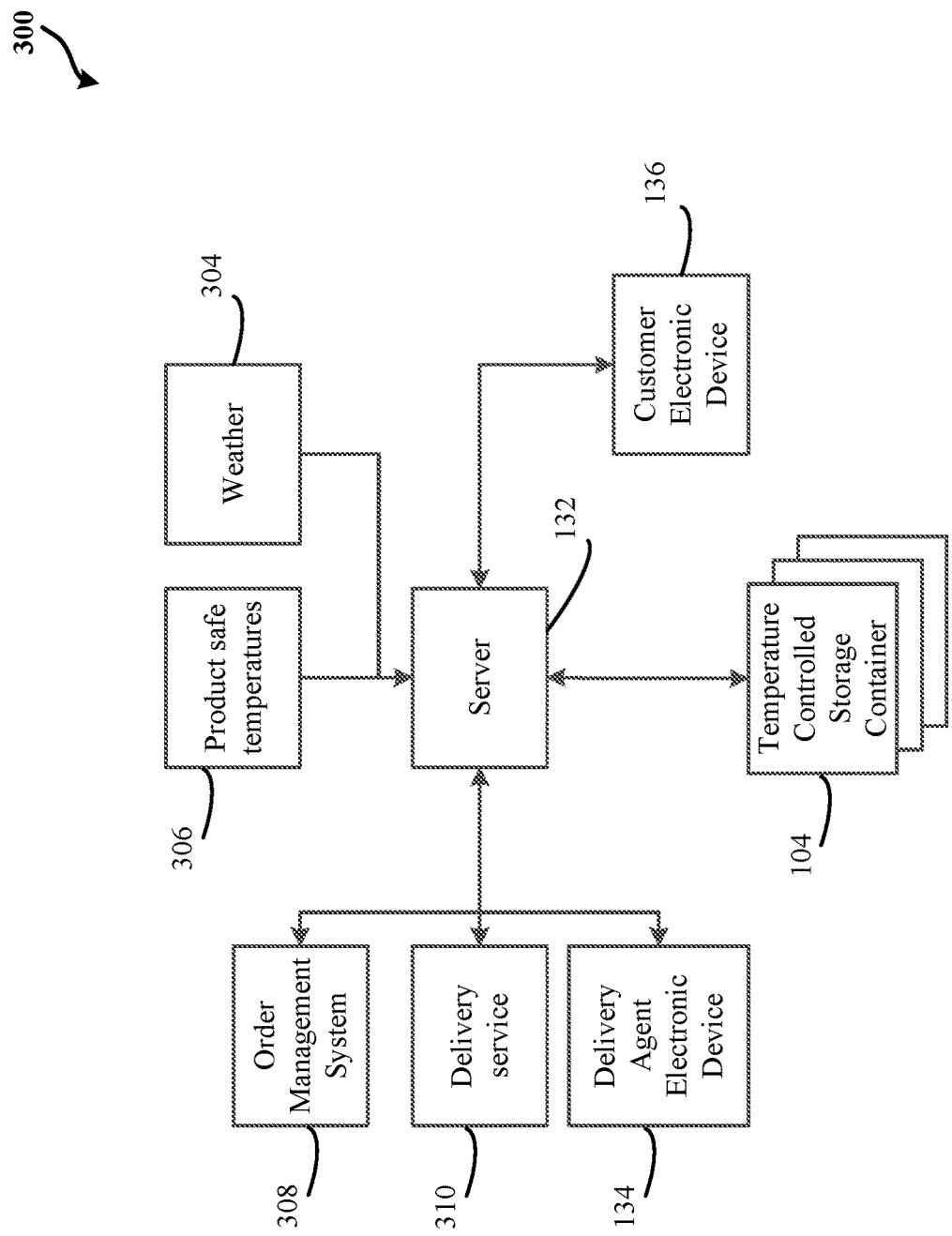
FIG. 3 illustrates a simplified block diagram of an exemplary system for receiving retail products to be delivered at a customer site in accordance with some embodiments.

FIG. 3 illustrates a simplified block diagram of an exemplary system 300 for receiving retail products to be delivered at a customer site in accordance with some embodiments. By one approach, the system 300 may be one of a plurality of illustrative non-limiting examples of the system 100 of FIG. 1 and/or the system 200 of FIG. 2. The system 300 includes the separate electronic control device 132. By one approach, the separate electronic control device 132 may receive one or more inputs, for example, weather 304 and/or product safe temperatures 306. In one example, the product safe temperatures 306 may correspond to temperatures of one or more retail products to be delivered. In another example, the weather 304 may correspond to an outside temperature of the storage container 104. In yet another example, a particular temperature assignment to one or more of chambers in the storage container 104 may be based on the weather 304 and/or product safe temperatures 306. By another approach, the separate electronic control device 132 may receive one or more inputs from an order management system 308, a delivery service 310, the delivery agent electronic device 134 associated with a delivery agent(s), and/or the customer electronic device 136. In one example, the order management system 308 may receive customer orders for one or more retail products. In another example, the delivery service 310 may include a plurality of delivery agents (e.g., associates of a retail stores, crowd-sourced delivery agents, third-party delivery agents, among other types of delivery agents) and/or businesses associated with delivery retail products. In another example, the customer electronic device 136 may unlock and/or lock the storage container 104 through the separate electronic control device 132.

Figure 4:
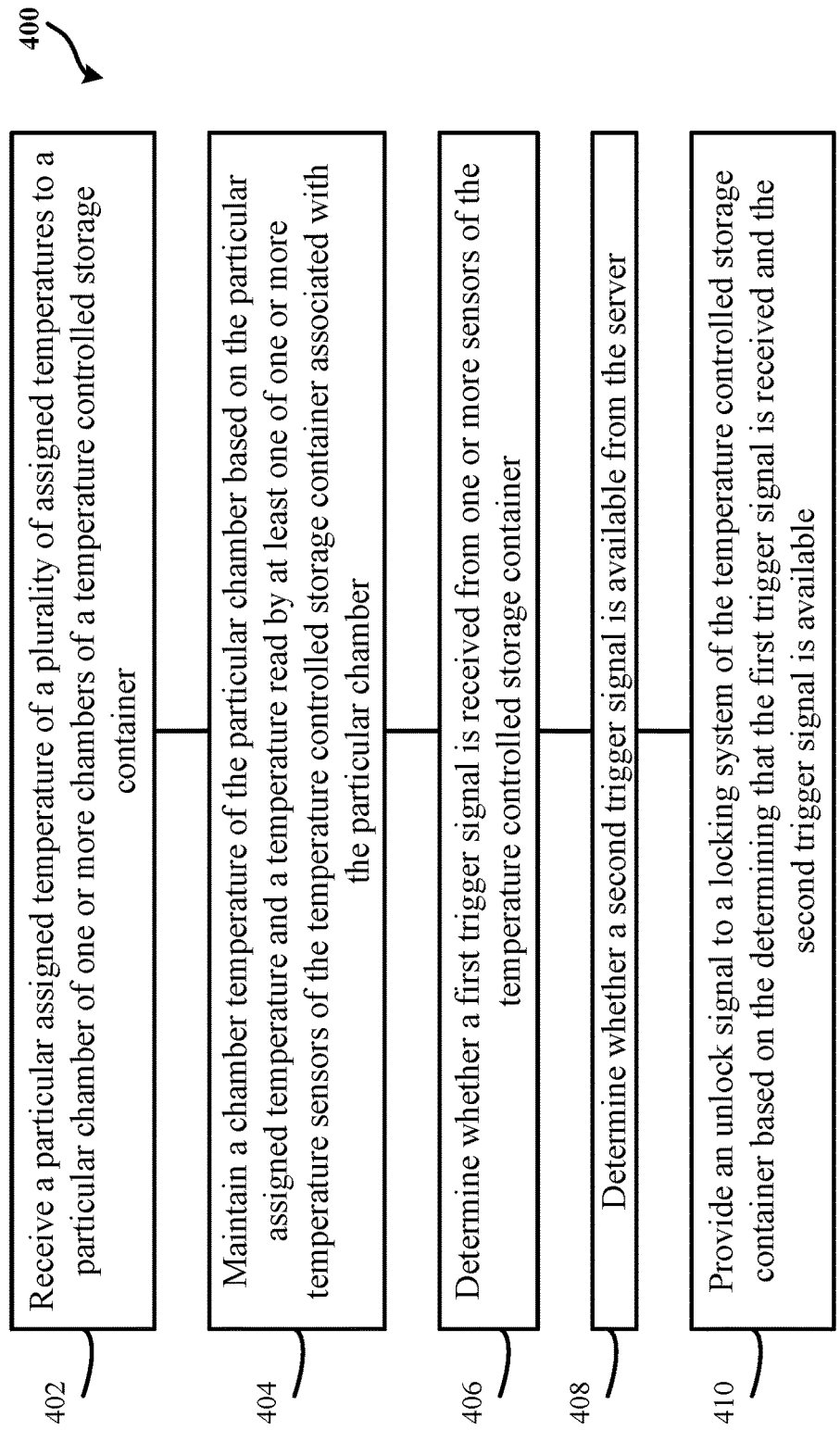
FIG. 4 shows a flow diagram of an exemplary process of receiving retail products to be delivered at a customer site in accordance with some embodiments.

FIG. 4 illustrates a flow diagram of an exemplary process of receiving retail products to be delivered at a customer site in accordance with some embodiments. The exemplary method 400 may be implemented in the system 100 of FIG. 1, the system 200 of FIG. 2, and/or the system 300 of FIG. 3. The method 400 includes, at step 402, receiving, from a separate electronic control device, a particular assigned temperature of a plurality of assigned temperatures to a particular chamber of one or more chambers of a temperature controlled storage container. By one approach, each of the one or more chambers may be assigned, by the separate electronic control device, a corresponding one of the plurality of assigned temperatures. In one configuration, the method 400 may include, at step 404, maintaining a chamber temperature of the particular chamber based on the particular assigned temperature and a temperature read by at least one of one or more temperature sensors of the temperature controlled storage container associated with the particular chamber. In another configuration, the method 400 may include, at step 406, determining whether a first trigger signal is received from one or more sensors of the temperature controlled storage container. By one approach, the method 400 may include, at step 408, determining whether a second trigger signal is available from the separate electronic control device. By another approach, the method 400 may include, at step 410, providing an unlock signal to a locking system of the temperature controlled storage container based on the determining that the first trigger signal is received and the second trigger signal is available. In one example, the unlock signal may enable access to the particular chamber.

Figure 5:
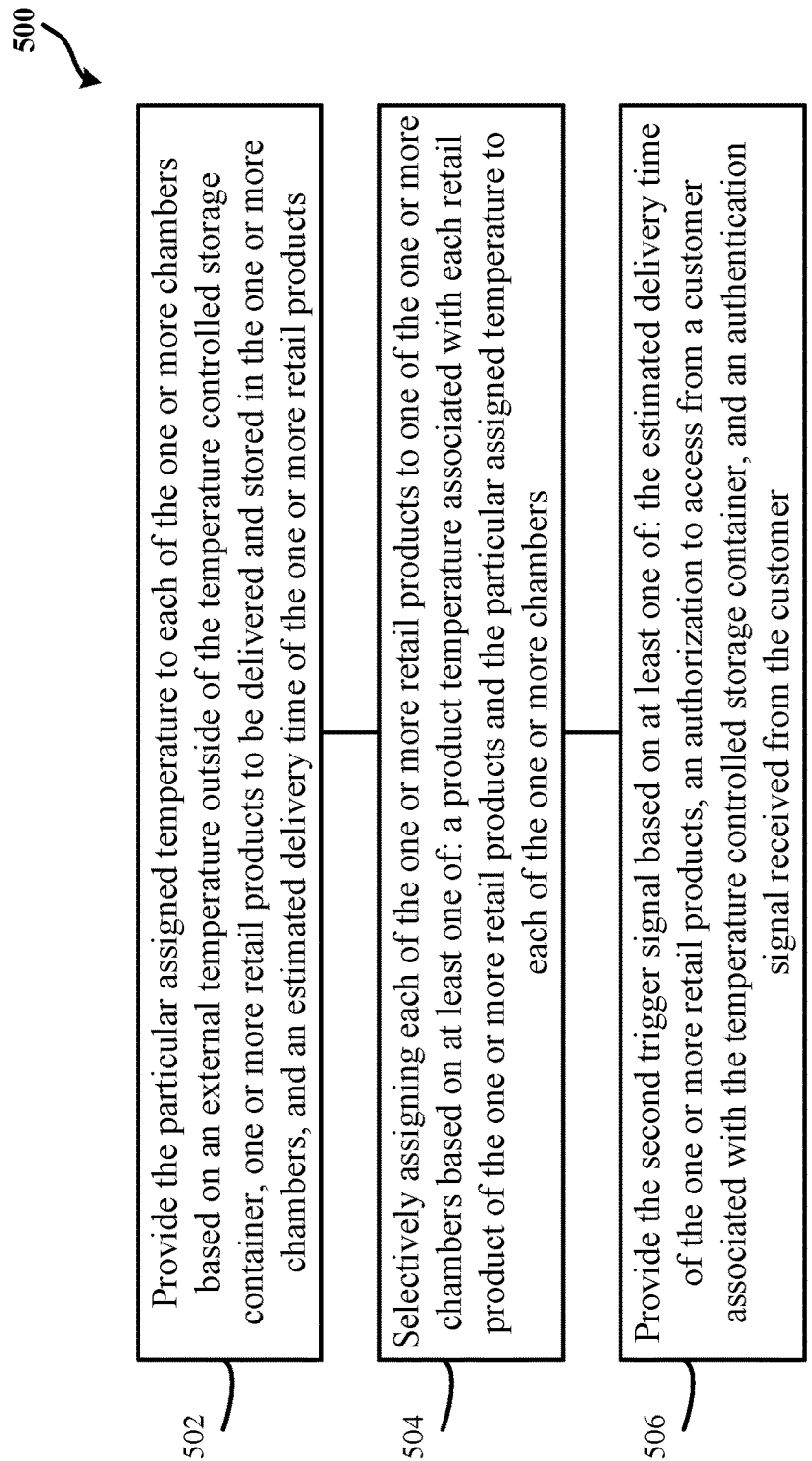
FIG. 5 shows a flow diagram of an exemplary process of receiving retail products to be delivered at a customer site in accordance with some embodiments.

FIG. 5 illustrates a flow diagram of an exemplary process of receiving retail products to be delivered at a customer site in accordance with some embodiments. By one approach, the exemplary method 500 may be implemented in the system 100 of FIG. 1, the system 200 of FIG. 2, and/or the system 300 of FIG. 3. By another approach, the method 500 and/or one or more steps of the method may optionally be included in and/or performed in cooperation with the method 400 of FIG. 4. The method 500 may include, at step 502, providing, by a separate electronic control device, a particular assigned temperature to each of one or more chambers based on an external temperature outside of a temperature controlled storage container, one or more retail products to be delivered and stored in the one or more chambers, and an estimated delivery time of the one or more retail products. In one configuration, the method 500 may include, at step 504, selectively assigning, by the separate electronic control device, each of the one or more retail products to one of the one or more chambers based on at least one of: a product temperature associated with each retail product of the one or more retail products and the particular assigned temperature to each of the one or more chambers. In another configuration, the method 500 may include providing, by the separate electronic control device, the second trigger signal based on at least one of: the estimated delivery time of the one or more retail products, an authorization to access from a customer associated with the temperature controlled storage container, and an authentication signal received from the customer, at step 506.

Figure 6:
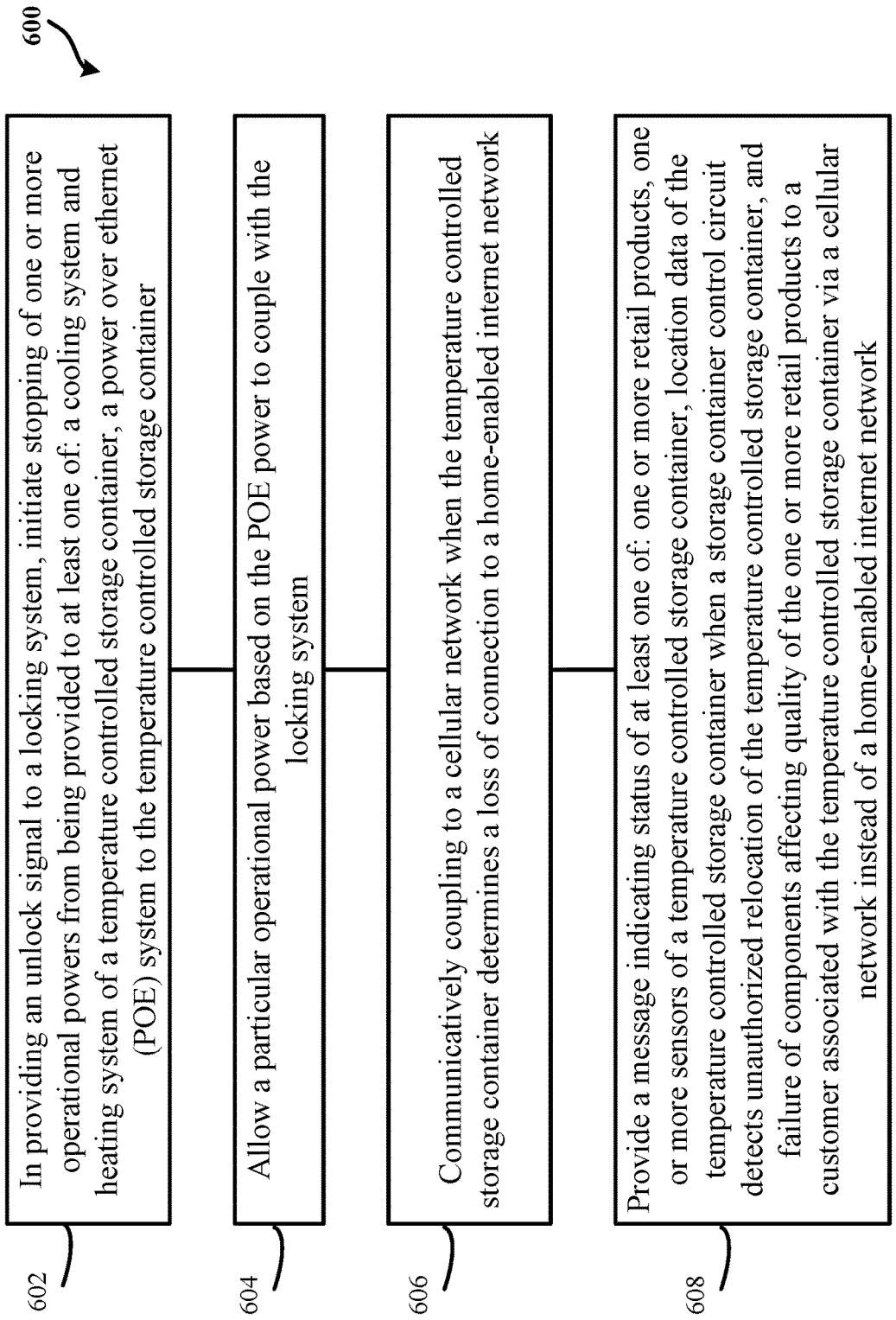
FIG. 6 shows a flow diagram of an exemplary process of receiving retail products to be delivered at a customer site in accordance with some embodiments.

FIG. 6 illustrates a flow diagram of an exemplary process of receiving retail products to be delivered at a customer site in accordance with some embodiments. By one approach, the exemplary method 600 may be implemented in the system 100 of FIG. 1, the system 200 of FIG. 2, and/or the system 300 of FIG. 3. By another approach, the method 600 and/or one or more steps of the method may optionally be included in and/or performed in cooperation with the method 400 of FIG. 4 and/or the method 500 of FIG. 5. The method 600 may include, at step 602, in providing an unlock signal to a locking system, stopping one or more operational powers from being provided to at least one of: a cooling system and heating system of a temperature controlled storage container. In one configuration, the one or more operational powers may be based on a POE power provided by a power over ethernet (POE) system to the temperature controlled storage container. In another configuration, the method 600 may include, at step 604, allowing a particular operational power based on the POE power to couple with the locking system. By one approach, the locking system may enable access to the at least one of the one or more chambers in response to coupling with the particular operational power. In another configuration, the method 600 may include, at step 606, communicatively coupling to a cellular network when the temperature controlled storage container determines a loss of connection to a home-enabled internet network. In yet another configuration, the method 600 may include providing a message indicating status of at least one of: the one or more retail products, one or more sensors of the temperature controlled storage container, location data of the temperature controlled storage container when the storage container control circuit detects unauthorized relocation of the temperature controlled storage container, and failure of components affecting quality of the one or more retail products to a customer associated with the temperature controlled storage container via the cellular network instead of the home-enabled internet network, at step 608.

Figure 7:
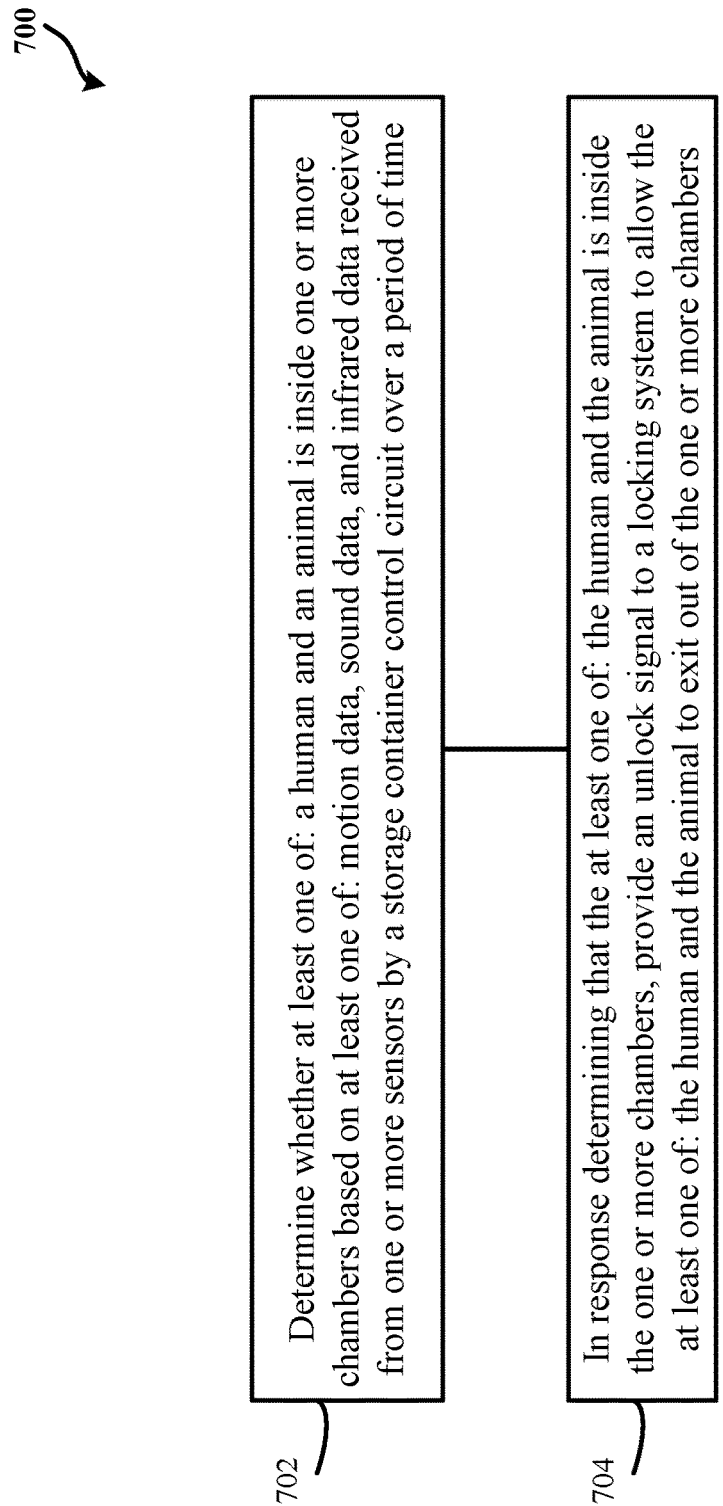
FIG. 7 shows a flow diagram of an exemplary process of receiving retail products to be delivered at a customer site in accordance with some embodiments.

FIG. 7 illustrates a flow diagram of an exemplary process of receiving retail products to be delivered at a customer site in accordance with some embodiments. By one approach, the exemplary method 700 may be implemented in the system 100 of FIG. 1, the system 200 of FIG. 2, and/or the system 300 of FIG. 3. By another approach, the method 700 and/or one or more steps of the method may optionally be included in and/or performed in cooperation with the method 400 of FIG. 4, the method 500 of FIG. 5, and/or the method 600 of FIG. 6. The method 700 may include, at step 702, determining whether at least one of: a human and an animal is inside the one or more chambers based on at least one of: motion data, sound data, and infrared data received from one or more sensors by the storage container control circuit over a period of time. By one approach, the 700 may include, at step 704, in response the determining that the at least one of: the human and the animal is inside the one or more chambers, providing the unlock signal to the locking system to allow the at least one of: the human and the animal to exit out of the one or more chambers.

Figure 8:
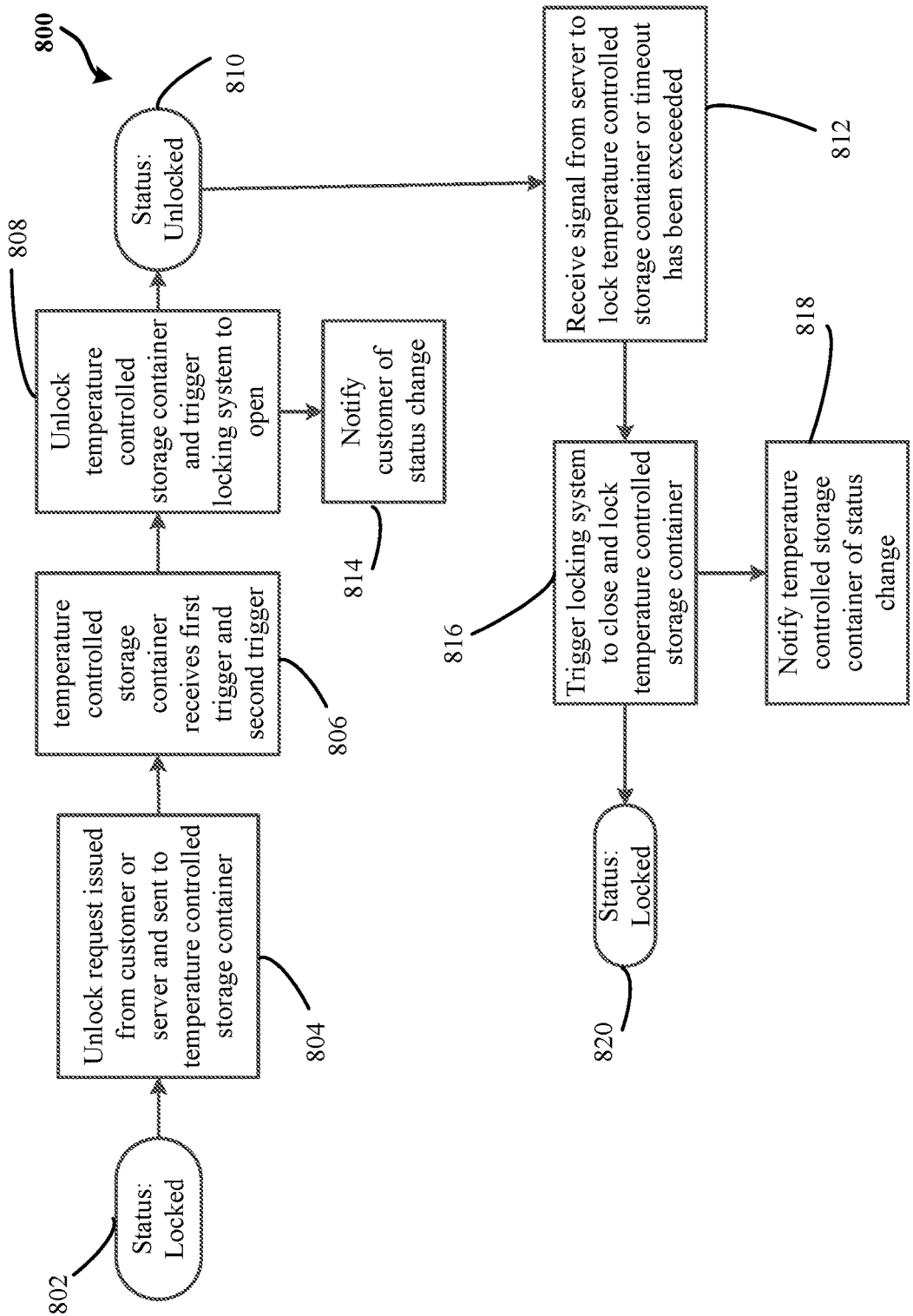
FIG. 8 shows a flow diagram of an exemplary process of receiving retail products to be delivered at a customer site in accordance with some embodiments.

FIG. 8 illustrates a flow diagram of an exemplary process of receiving retail products to be delivered at a customer site in accordance with some embodiments. By one approach, the exemplary method 800 may be implemented in the system 100 of FIG. 1, the system 200 of FIG. 2, and/or the system 300 of FIG. 3. By another approach, the method 700 and/or one or more steps of the method may optionally be included in and/or performed in cooperation with the method 400 of FIG. 4, the method 500 of FIG. 5, the method 600 of FIG. 6, and/or the method 700 of FIG. 7. The method 800 may include, at step 802, determining status of a temperature controlled storage container. By one approach, the method 800 may include, at step 804, unlocking request issued from a customer and/or a separate electronic control device and sent to the storage container. In one example, the unlocking request may be directly issued from the customer to the storage container. In another example, the unlocking request may be initiated by the customer through the separate electronic control device. By another approach, the method 800 may include the storage container receiving a first trigger and a second trigger, at step 806. In one configuration, the method 800, at step 808, may activate the unlock system of the storage container to unlock the storage container and may trigger the locking system to automatically open. In one scenario, the locking system may unlatch a lid of the storage container. In one example, the method 800, at step 814, may notify the customer of the status change of the storage container (e.g., status change from lock to unlock status). In one configuration, the method 800, at step 810, determining the status of the storage container. In one example, the status may be unlock. In another configuration, the method 800 may include, at step 812, receiving signal from the separate electronic control device to lock the storage container and/or timeout has been exceeded. By one approach, the method 800 may include, at step 816, in response to the received signal, triggering the locking system to close and/or lock the storage container. In one example, the method 800 may include, at step 818, in response to the triggering, notifying the customer of status change. In another example, the method 800 may include changing status of the storage container to locked, at step 820.

Figure 9:
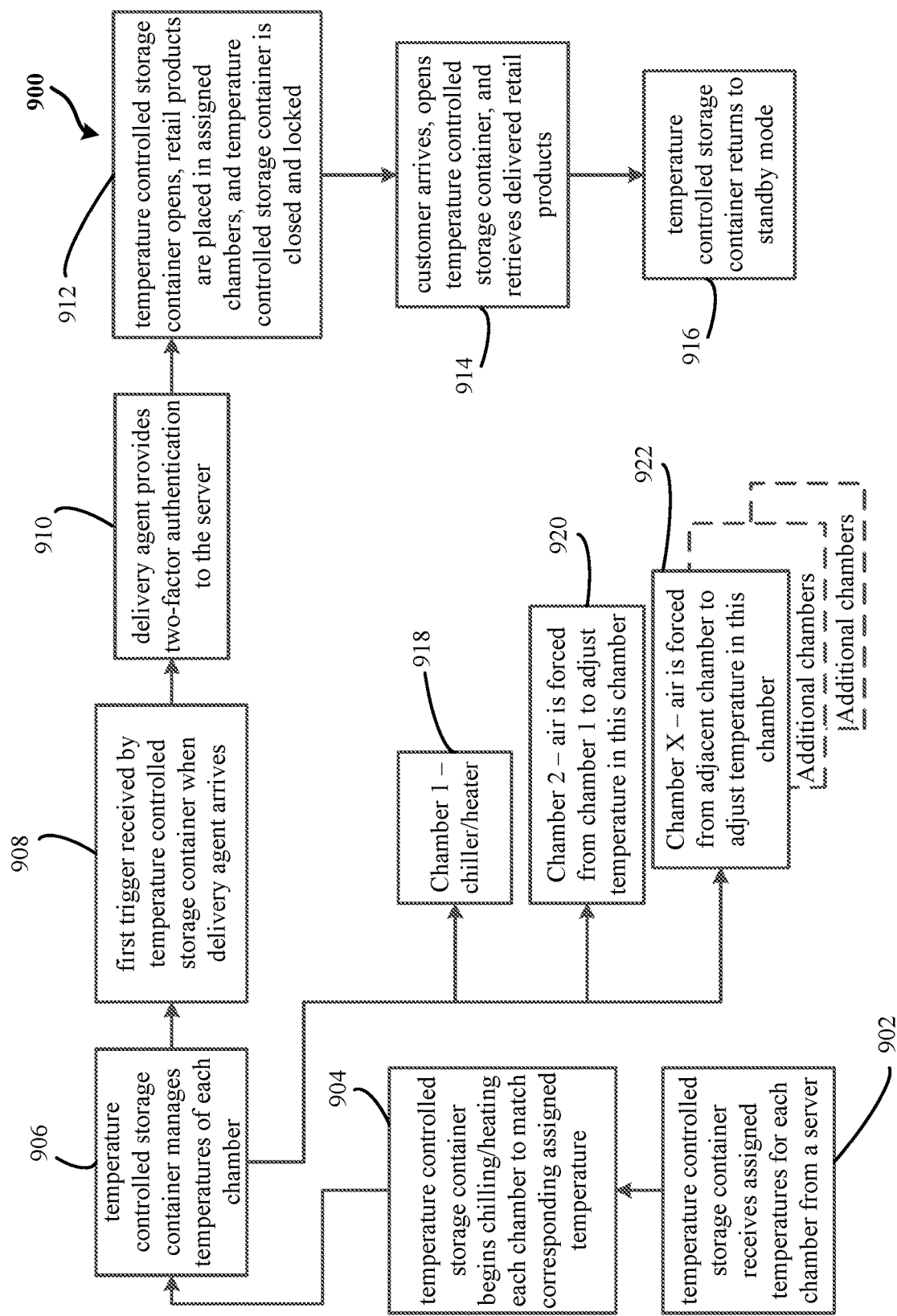
FIG. 9 shows a flow diagram of an exemplary process of receiving retail products to be delivered at a customer site in accordance with some embodiments.

FIG. 9 illustrates a flow diagram of an exemplary process of receiving retail products to be delivered at a customer site in accordance with some embodiments. By one approach, the exemplary method 900 may be implemented in the system 100 of FIG. 1, the system 200 of FIG. 2, and/or the system 300 of FIG. 3. By another approach, the method 900 and/or one or more steps of the method may optionally be included in and/or performed in cooperation with the method 400 of FIG. 4, the method 500 of FIG. 5, the method 600 of FIG. 6, the method 700 of FIG. 7, and/or the method 800 of FIG. 8. The method 900 may include, at step 902, receiving, at a storage container control circuit, order parameters from a separate electronic control device. In one example, the order parameters may include temperature assignments of one or more chambers of the storage container, expected delivery time, and/or one or more retail products to be delivered and stored in the storage container. By one approach, the method 900 may include, at step 904, initiating, by the storage container control circuit, chilling and/or heating one or more of chambers in the storage container to match the delivery parameters. In one example, the chilling and/or the heating may be initiated based on the assigned temperature of the one or more chambers, the expected delivery time, and/or the one or more retail products to be delivered. In one configuration, the method 900 may include, at step 906, managing, by the storage container control circuit, temperatures of each chamber of the one or more chambers. By another approach, the method 900 may include, at step 908, receiving, by the storage container, a first trigger to unlock the storage container. In one example, the first trigger may include motion data provided by a motion sensor, radio frequency signal emitted by a user device, infrared data provided by infrared sensor, and imaging data provided by an imaging sensor of the storage container.

By another approach, the method 900 may include, at step 910, providing a two-factor authentication by a delivery agent and/or a delivery service agent to the separate electronic control device. In one example, the two-factor authentications may include passcode, biometric authentication, and/or other type of authentications to verify whether a user is authorized to access the storage container. In one configuration, the method 900 may include, upon verification of the two-factor authentication provided to the separate electronic control device and/or the receipt of the first trigger by the storage container, opening the storage container, placing one or more of the retail products according to determined placement assignments of the retail products in the chambers, and/or closing and/or locking the storage container, at step 912. In another configuration, the method 900 may include, at step 914, opening the storage container by the customer and retrieving of the retail products placed in the chambers. In yet another configuration, the method may include returning the status of the storage container to standby mode upon closing and/or locking of the storage container, at step 916. In some embodiments, in managing the temperatures of storage container in step 906, the method 900 may include initiating operation of chiller and/or heater based on the assigned temperature associated with chamber 1, at step 918. By one approach, the method 900, at step 920, adjusting temperature of chamber 2 by forcing air out from chamber 1 to chamber 2. By another approach, the method 900, at step 922, adjusting temperature of adjacent chambers by forcing air out from a previous chamber to an adjacent chamber.

Figure 10:
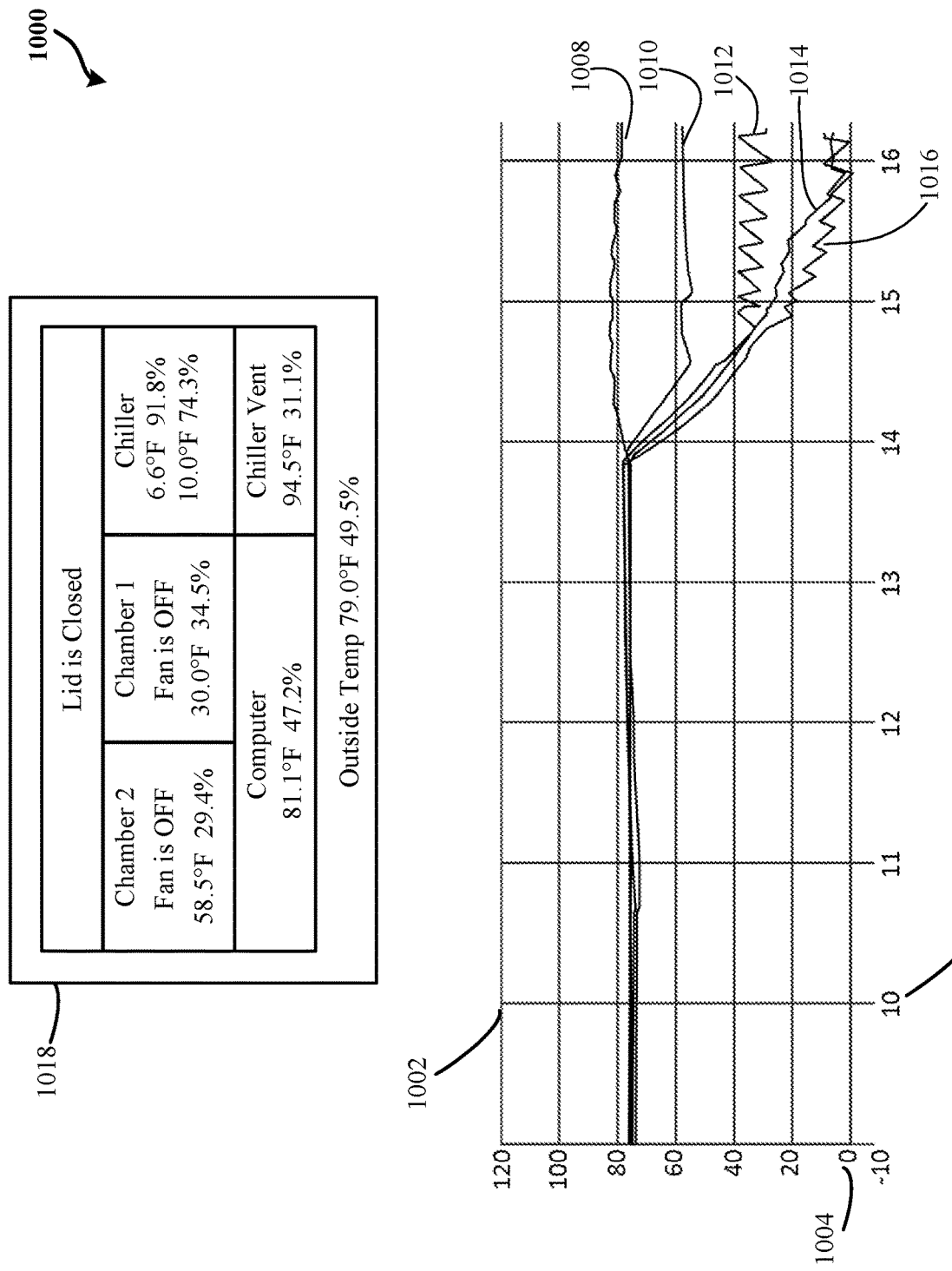
FIG. 10 shows an illustrative non-limiting test data of an exemplary system for receiving retail products to be delivered at a customer site in accordance with some embodiments.

FIG. 10 shows an illustrative non-limiting test data 1000 of an exemplary system for receiving retail products to be delivered at a customer site in accordance with some embodiments. The test data 1000 shows a chart 1002 having temperature (° F.) in y-axis 1004 and time (24-hr clock) in x-axis 1006. In addition, data at fan off 1018 indicates temperature (° F.) and humidity (%) of chamber 1, chamber 2, chiller, chiller vent, computer, and outside temperature at the time the fan was turned off. The outside temperature is the temperature external to the storage container 104. In the chart 1002, a first data 1008 indicates temperature corresponding to the outside temperature, a second data 1010 indicates temperature corresponding to the chamber 2, a third data 1012 indicates temperature corresponding to the chamber 1, a fourth data 1014 and a fifth data 1016 indicate temperature corresponding to the chiller. The test data 1000 illustrates that the storage container control circuit 102 of FIG. 1 and FIG. 2 is successful in maintaining an assigned temperature for each of chamber 1 and chamber 2. For example, prior to a start of a receipt of the test data 1000, the storage container control circuit 102 received a first assigned temperature for chamber 1 and a second assigned temperature for chamber 2 and their corresponding predefined thresholds. As shown in the chart 1002, the fan was turned on at a first time prior to 14 (i.e., 1400 hr). In less an hour, at a second time prior to 15 (i.e., 1500 hr), both chamber 1 and chamber 2 are maintaining their corresponding temperatures within their corresponding predefined thresholds: the third data 1012 and the second data 1010, respectively, as indicated in chart 1002. Thus, the chart 1002 illustrates that the storage container control circuit 102 is able to maintain the temperatures in both chamber 1 and chamber 2 of the storage container 104 within the predefined thresholds of their assigned temperatures.

Figure 11:
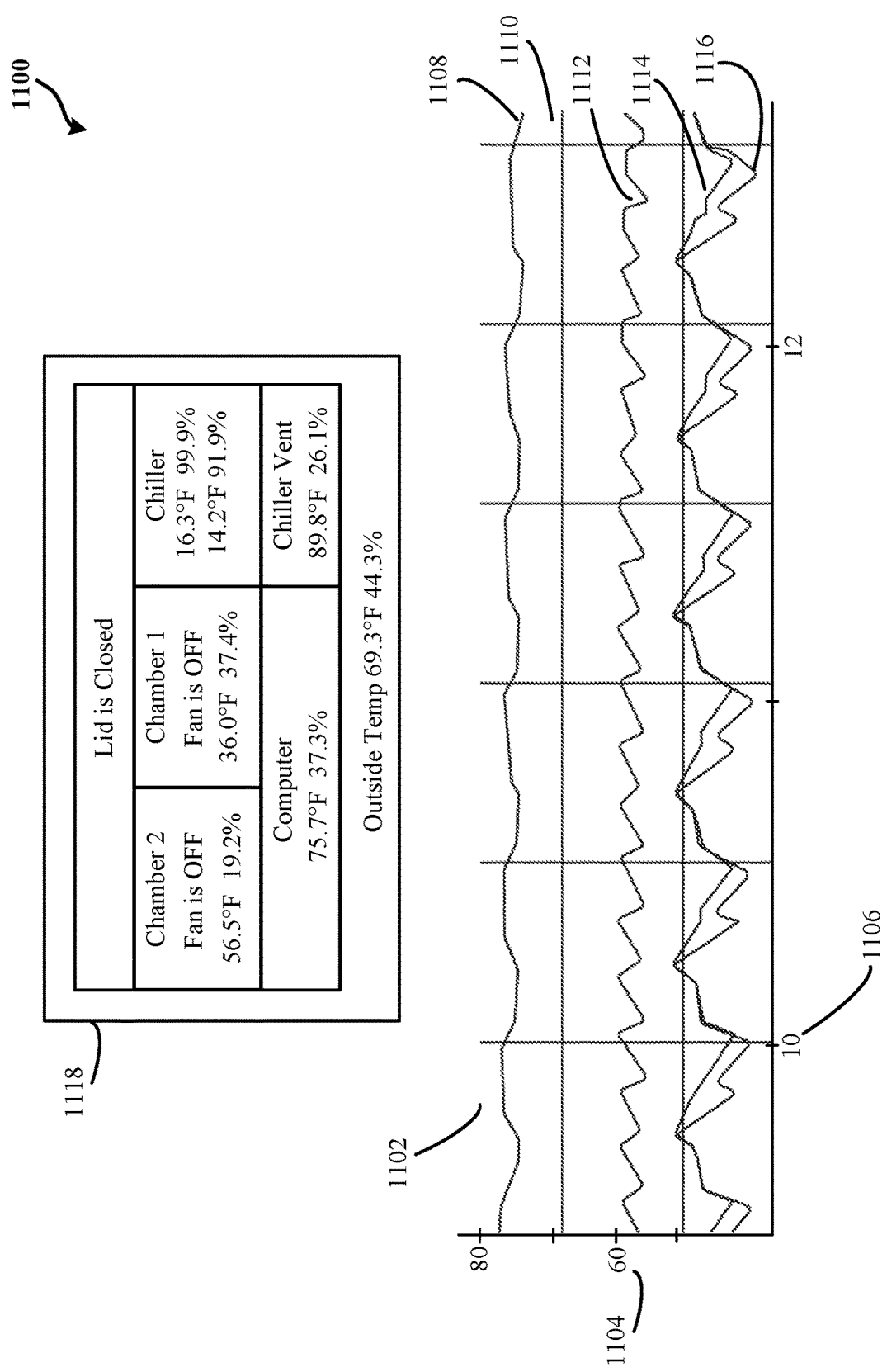
FIG. 11 shows an illustrative non-limiting test data of an exemplary system for receiving retail products to be delivered at a customer site in accordance with some embodiments.

FIG. 11 shows an illustrative non-limiting test data 1100 of an exemplary system for receiving retail products to be delivered at a customer site in accordance with some embodiments. The test data 1100 shows a chart 1102 having temperature (° F.) in y-axis 1104 and time (24-hr clock) in x-axis 1106. In addition, data at fan off 1118 indicates temperature (° F.) and humidity (%) of chamber 1, chamber 2, chiller, chiller vent, computer, and outside temperature at the time the fan was turned off. The outside temperature is the temperature external to the storage container 104. In the chart 1102, a first data 1108 indicates temperature corresponding to the outside temperature, a second data 1110 indicates temperature corresponding to the chamber 2, a third data 1112 indicates temperature corresponding to the chamber 1, a fourth data 1114 and a fifth data 1116 indicate temperature corresponding to the chiller. The test data 1100 illustrates that the storage container control circuit 102 of FIG. 1 and FIG. 2 is successful in maintaining the separate electronic control device 132 assigned temperatures of each chamber 1 and chamber 2 within corresponding predefined thresholds particular to the chamber 1 and the chamber 2 over a period of time: the third data 1112 and the second data 1110, respectively, as indicated in chart 1102. The data shown in the chart 1102 are temperature data received over a portion of the period of time.

FIG. 12 shows an illustrative non-limiting test data 1200 of an exemplary system for receiving retail products to be delivered at a customer site in accordance with some embodiments. The test data 1200 indicates simulated environments that the storage container 104 may be subjected to while at a customer site. The test data 1200 includes a first column for date, a second column for comment, a third column for time, a fourth column for outside temperature, a fifth column for chamber 1 temperature, a sixth column for chiller temperature, a seventh column for delta, and an eight column for compressor temperature. For example, on a first day 1202, the outside temperature is gradually increased to simulate a hot outside temperature environment while the fan of the storage container 104 is turned on to move cold air from the chiller to the chamber 1. As shown in the test data 1200, while temperatures in the fourth column for outside temperature are increasing, temperatures in the fifth column for chamber 1 temperature are also increasing. However, the temperatures in the fifth column for chamber 1 temperature are kept below a freezing temperature of 32° F. by the chiller. Since the cold air is moved from the chiller to the chamber 1, temperature of the chiller started increasing as shown in increased temperatures in the sixth column for the chiller temperature. However, the storage container control circuit 102 maintained an average of 3° F. difference between the temperature in the chiller and the chamber 1 as shown in the seventh column for delta.

On a second day 1204, at 15:57 hr, the fan was turned off. The chamber 1 temperature started increasing passed the freezing temperature as shown in the fifth column for the chamber 1 temperature while the chiller temperature started decreasing to a negative temperature. The compressor temperature kept an average temperature of 117° F. over the first day 1202 and the second day 1204. On a third day 1206, at 8:41 hr, the fan remained off while at a simulated hot outside environment. The chamber 1 temperature remained above the freezing temperature while the chiller kept cold. On fourth day 1208, at 8:06 hr, the fan was turned on. The chamber 1 temperature started decreasing towards the freezing temperature and reached the freezing temperature in less than two hours. The storage container control circuit 102 kept the chiller temperature and the chamber 1 temperature within the average of 3° F. difference as shown in the seventh column for delta. Thus, the test data 1200 illustrates that the storage container control circuit 102 maintained the chamber 1 temperature at below freezing using the fan to move the cold air from the chiller to the chamber 1. As such, FIGS. 10-12 illustrate that the storage container control circuit 102 may receive, from the separate electronic control device 132, assigned temperatures for each chamber of the storage container 104 and successfully maintain each chamber within a threshold of the assigned temperature. In an illustrative non-limiting example, the storage container control circuit 102 may implement a fan, among other ways to maintain the assigned temperatures, to circulate air as one of several examples to adjust a temperature of a chamber.

Figure 13:
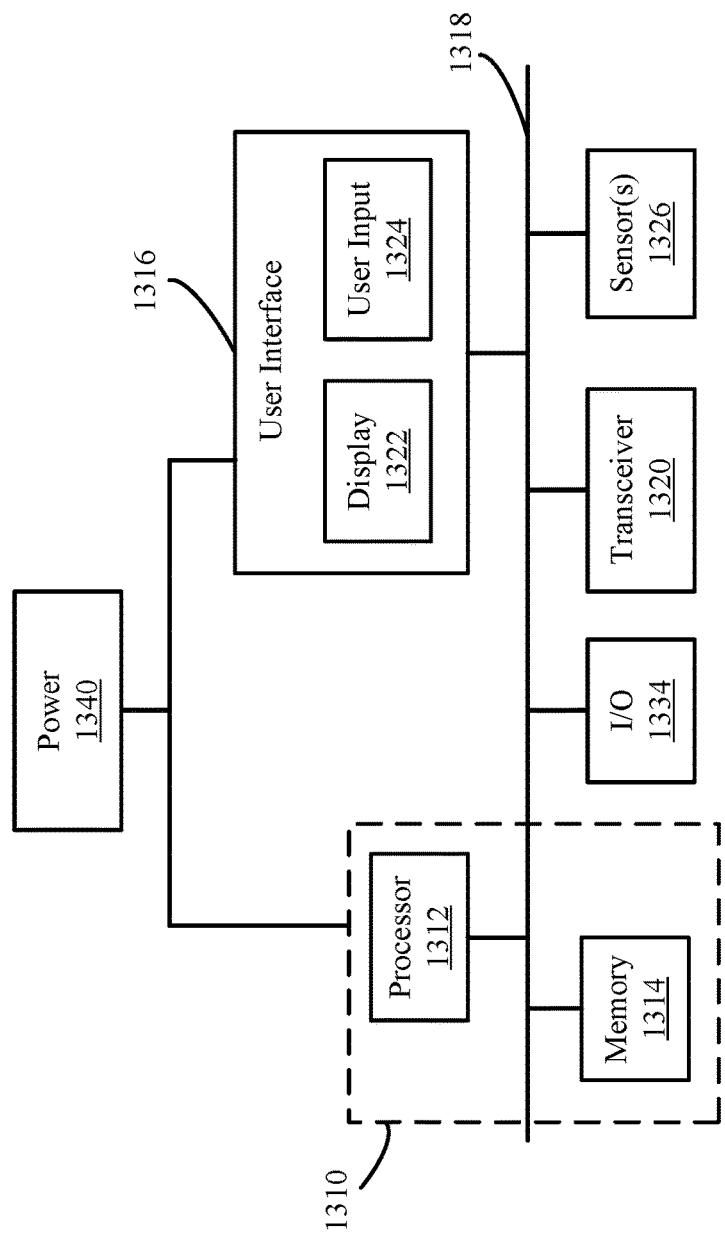
FIG. 13 illustrates an exemplary system for use in implementing methods, techniques, devices, apparatuses, systems, servers, electronic control devices, sources and receiving retail products, in accordance with some embodiments.

Further, the circuits, circuitry, systems, devices, processes, methods, techniques, functionality, services, servers, electronic control devices, sources and the like described herein may be utilized, implemented and/or run on many different types of devices and/or systems. FIG. 13 illustrates an exemplary system 1300 that may be used for implementing any of the components, circuits, circuitry, systems, functionality, apparatuses, processes, or devices of the system 100 of FIG. 1, the system 200 of FIG. 2, the system 300 of FIG. 3, the method 400 of FIG. 4, the method 500 of FIG. 5, the method 600 of FIG. 6, the method 700 of FIG. 7, the method 800 of FIG. 8, the method 900 of FIG. 9, and/or other above or below mentioned systems or devices, or parts of such circuits, circuitry, functionality, systems, apparatuses, processes, or devices. For example, the system 1300 may be used to implement some or all of the system, components, and/or elements for receiving retail products to be delivered at the system 100 of FIG. 1, the system 200 of FIG. 2, the system 300 of FIG. 3, and/or other such components, circuitry, functionality and/or devices. However, the use of the system 1000 or any portion thereof is certainly not required.

By way of example, the system 1300 may comprise a processor module (or a control circuit) 1312, memory 1314, and one or more communication links, paths, buses or the like 1318. Some embodiments may include one or more user interfaces 1316, and/or one or more internal and/or external power sources or supplies 1340. The control circuit 1312 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 1312 can be part of control circuitry and/or a control system 1310, which may be implemented through one or more processors with access to one or more memory 1314 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 1300 may be used to implement one or more of the above or below, or parts of, components, circuits, systems, processes and the like. For example, the system 1300 may implement the system for receiving retail products at the system 100 of FIG. 1 with the control circuit 102 being the control circuit 1312. Another example, the system 1300 may implement the system for receiving retail products at the system 200 of FIG. 2 with the storage container control circuit 102 being the control circuit 1312. Another example, the system 1300 may implement the system for receiving retail products at the system 300 of FIG. 3 with the separate electronic control device 132 being the control circuit 1312.

The user interface 1316 can allow a user to interact with the system 1300 and receive information through the system. In some instances, the user interface 1316 includes a display 1322 and/or one or more user inputs 1324, such as buttons, touch screen, track ball, keyboard, mouse, etc., which can be part of or wired or wirelessly coupled with the system 1300. Typically, the system 1300 further includes one or more communication interfaces, ports, transceivers 1320 and the like allowing the system 1300 to communicate over a communication bus, a distributed computer and/or communication network (e.g., a local area network (LAN), the Internet, wide area network (WAN), etc.), communication link 1318, other networks or communication channels with other devices and/or other such communications or combination of two or more of such communication methods. Further the transceiver 1320 can be configured for wired, wireless, optical, fiber optical cable, satellite, or other such communication configurations or combinations of two or more of such communications. Some embodiments include one or more input/output (I/O) interface 1334 that allow one or more devices to couple with the system 1300. The I/O interface can be substantially any relevant port or combinations of ports, such as but not limited to USB, Ethernet, or other such ports. The I/O interface 1334 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 1326 to provide information to the system and/or sensor information that is communicated to another component, such as a storage container control circuit, a temperature controlled storage container, a separate electronic control device, a heating and cooling systems, a control circuit, an order management system, etc. The sensors can include substantially any relevant sensor, such as temperature sensors, distance measurement sensors (e.g., optical units, sound/ultrasound units, etc.), optical based scanning sensors to sense and read optical patterns (e.g., bar codes), radio frequency identification (RFID) tag reader sensors capable of reading RFID tags in proximity to the sensor, and other such sensors. The foregoing examples are intended to be illustrative and are not intended to convey an exhaustive listing of all possible sensors. Instead, it will be understood that these teachings will accommodate sensing any of a wide variety of circumstances in a given application setting.

The system 1300 comprises an example of a control and/or processor-based system with the control circuit 1312. Again, the control circuit 1312 can be implemented through one or more processors, controllers, central processing units, logic, software and the like. Further, in some implementations the control circuit 1312 may provide multiprocessor functionality.

The memory 1314, which can be accessed by the control circuit 1312, typically includes one or more processor readable and/or computer readable media accessed by at least the control circuit 1312, and can include volatile and/or non-volatile media, such as RAM, ROM, EEPROM, flash memory and/or other memory technology. Further, the memory 1314 is shown as internal to the control system 1310; however, the memory 1314 can be internal, external or a combination of internal and external memory. Similarly, some or all of the memory 1314 can be internal, external or a combination of internal and external memory of the control circuit 1312. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network. The memory 1314 can store code, software, executables, scripts, data, content, lists, programming, programs, log or history data, user information, customer information, product information, and the like. While FIG. 13 illustrates the various components being coupled together via a bus, it is understood that the various components may actually be coupled to the control circuit and/or one or more other components directly.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for receiving retail products comprising:
a storage container comprising:
one or more chambers to receive retail products;
one or more sensors comprising at least a radio frequency sensor;
a locking system comprising a locking mechanism and configured to: receive a lock signal to disable access to at least one of the one or more chambers; and receive an unlock signal to enable access to the at least one of the one or more chambers; and
a storage container control circuit operatively coupled to the one or more sensors and the locking system, the storage container control circuit configured to provide the unlock signal based on a first trigger signal associated with at least one of the one or more sensors and a second trigger signal associated with an electronic control device to enable access to the at least one of the one or more chambers,
wherein the second trigger signal is initiated when one or more retail products are within a threshold distance from the storage container.

2. The system of claim 1, further comprising a power over ethernet (POE) system configured to provide POE power to the storage container, wherein the POE power is down converted to one or more operational powers used by the storage container control circuit.

3. The system of claim 2, wherein, in providing the unlock signal to the locking system, the storage container control circuit is further configured to:
allow a particular operational power that is based on the POE power to couple with the locking system, wherein the locking system is configured to enable access to the at least one of the one or more chambers in response to the coupling with the particular operational power.

4. The system of claim 2, further comprising a battery configured to initiate backup power to the storage container when the POE power is not provided to the storage container.

5. The system of claim 1, wherein the storage container control circuit is further configured to:
communicatively couple to a cellular network when the storage container determines a loss of connection to a home-enabled internet network; and
provide a message indicating status of at least one of: one or more retail products to be delivered and stored in the one or more chambers, the one or more sensors to a customer associated with the storage container via the cellular network instead of the home-enabled internet network.

6. The system of claim 1, further comprising one or more second sensors coupled to the storage container control circuit, wherein at least one of the one or more second sensors is configured to provide at least one of: motion data, sound data, and infrared data inside the one or more chambers, wherein the storage container control circuit is further configured to:
determine whether at least one of: a human and an animal is inside the one or more chambers based on the at least one of: motion data, sound data, and infrared data received by the storage container control circuit over a period of time; and
in response to the determination that the at least one of: the human and the animal is inside the one or more chambers, provide the unlock signal to the locking assembly to allow the at least one of: the human and the animal to exit out of the one or more chambers.

7. The system of claim 1, wherein the storage container further comprises at least one channel system on at least a portion of a perimeter surface of the storage container, the at least one channel system is configured to receive one or more interchangeable skin panels secured by grooves of the at least one channel system to add a customizable surface on the at least a portion of the perimeter surface of the storage container.

8. The system of claim 1, wherein the storage container is configured to only be communicatively coupled to a user via one or more remote connections to the storage container control circuit.

9. The system of claim 1, further comprising:
one or more second sensors configured to provide data corresponding to living beings approaching the storage container, wherein the storage container control circuit is further configured to:
determine whether a third trigger signal is received from one of the one or more second sensors;
determine whether a fourth trigger signal is available from a server; and
provide the unlock signal to the locking system based on the determination that the third trigger signal is received and that the fourth trigger signal is available to enable access to the at least one of the one or more chambers; and
the server remote from and communicatively coupled to the storage container, the server configured to:
provide the fourth trigger signal based on at least one of: an estimated delivery time of the one or more retail products, an authorization to access from a customer associated with the storage container, and an authentication signal received from the customer.

10. The system of claim 1, wherein the locking mechanism comprises at least one of a latch, a magnetic lock, a solenoid lock, and a motor lock.

11. The system of claim 1, wherein the second trigger signal is provided based on at least one of an estimated delivery time of the one or more retail products, an authorization to access from a customer associated with the storage container, and an authentication signal received from the customer via the electronic control device.

12. A method for receiving retail products comprising:
by a storage container comprising a locking system comprising a locking mechanism, one or more sensors, one or more chambers, and a storage container control circuit:
receiving, at the locking system, a lock signal to disable access to at least one of the one or more chambers that receive retail products;
receiving, at the locking system, an unlock signal to enable access to the at least one of the one or more chambers; and
providing, by the storage container control circuit, the unlock signal based on a first trigger signal associated with at least one of the one or more sensors and a second trigger signal associated with an electronic control device to enable access to the one or more chambers, the one or more sensors comprising at least a radio frequency sensor,
wherein the second trigger signal is initiated when one or more retail products are within a threshold distance from the storage container.

13. The method of claim 12, further comprising:
   determining, by one or more second sensors, whether at least one of: a human and an animal is inside the one or more chambers based on at least one of: motion data, sound data, and infrared data received by the storage container control circuit over a period of time, wherein the storage container further comprises the one or more second sensors; and
   in response to the determining that the at least one of: the human and the animal is inside the one or more chambers, providing, by the storage container control circuit, the unlock signal to the locking system to allow the at least one of: the human and the animal to exit out of the one or more chambers.

14. The method of claim 12, wherein the storage container is configured to only be communicatively coupled to a user via one or more remote connections to the storage container.

15. The method of claim 12, further comprising receiving, at the storage container, power from at least one of a battery and a power over ethernet (POE) system.

16. A system for receiving retail products comprising:
   a storage container comprising:
   one or more chambers to receive retail products;
   one or more sensors configured to provide data used to unlock at least one of the one or more chambers;
   a locking system comprising a locking mechanism and configured to: receive a lock signal to disable access to the at least one of the one or more chambers; and receive an unlock signal to enable access to the at least one of the one or more chambers; and
   a storage container control circuit operatively coupled to the one or more sensors and the locking system, the storage container control circuit configured to provide the unlock signal based on a first trigger signal associated with at least one of the one or more sensors and a second trigger signal associated with an electronic control device to enable access to the at least one of the one or more chambers,
   wherein the second trigger signal is initiated when one or more retail products are within a threshold distance from the storage container.

17. The system of claim 16, wherein the locking mechanism comprises at least one of a latch, a magnetic lock, a solenoid lock, and a motor lock.

18. The system of claim 16, wherein the first trigger signal comprises a radio frequency signal emitted by a user device.

* * * * *